US008860602B2

(12) United States Patent
Nohara et al.

(10) Patent No.: US 8,860,602 B2
(45) Date of Patent: Oct. 14, 2014

(54) DEVICE AND METHOD FOR COGNITIVE RADAR INFORMATION NETWORK

(71) Applicant: Accipiter Radar Technologies, Inc., Fenwick (CA)

(72) Inventors: Timothy J. Nohara, Fonthill (CA); Simon Haykin, Ancaster (CA)

(73) Assignee: Accipiter Radar Technologies Inc., Ontario (CA)

( * ) Notice: Subject to any disclaimer, the term of this patent is extended or adjusted under 35 U.S.C. 154(b) by 192 days.

(21) Appl. No.: 13/647,761

(22) Filed: Oct. 9, 2012

(65) Prior Publication Data
US 2014/0097979 A1 Apr. 10, 2014

(51) Int. Cl.
G01S 13/95 (2006.01)
G01S 13/87 (2006.01)
G01S 7/00 (2006.01)
G01S 13/538 (2006.01)
G01S 7/295 (2006.01)

(52) U.S. Cl.
CPC ............... G01S 13/538 (2013.01); G01S 7/295 (2013.01); G01S 7/003 (2013.01); G01S 13/87 (2013.01)
USPC ............... 342/26 R; 342/59; 342/95; 342/90; 342/195

(58) Field of Classification Search
CPC ..... G01S 7/412; G01S 13/953; G01S 13/003; G01S 7/003; G01S 13/878; G01S 13/867; G01S 13/726; G01S 13/95; G01S 13/951; G01S 13/958
USPC ..... 342/90, 26 R, 26 A–26 D, 59, 95–97, 195
See application file for complete search history.

(56) References Cited

U.S. PATENT DOCUMENTS 2,444,770 A 7/1948 Fyler
2,444,771 A 7/1948 Fyler
(Continued)

FOREIGN PATENT DOCUMENTS

EP 0033059 A2 8/1981
GB 2176073 A 12/1986
(Continued)

OTHER PUBLICATIONS

"Vessell Traffic Management & Information Systems Applications". Norcontrol IT AS. Aug. 2000.

(Continued)

Primary Examiner — John B Sotomayor
(74) Attorney, Agent, or Firm — R. Neil Sudol; Henry D. Coleman

(57) ABSTRACT

In cognitive radar information networks (CRINs) human-like cognitive abilities of attention and intelligence are built into radar systems and radar information networks (RINS) to assist operators with information overload. A CRIN comprises a plurality of radar sensing nodes monitoring an environment, a repository or memory, and a cognitive radar controller. Each radar sensing node includes a radio frequency transmitter, a transmitting antenna, and a receiver and receiving antenna. The receiver includes a digital radar processor for generating receiver information from the received echoes about the environment. The repository is configured for receiving and storing the receiver information generated by the digital radar processor. The cognitive controller is configured to automatically focus the system's attention on a region of interest within the surveillance volume in response to an attention request, by selecting the transmitter's waveform, selecting the receiver's processing mode, and controlling the transmitter's antenna. The cognitive controller learns from the environment by exploiting the repository's historical receiver information and further learns from the consequences of its past decision.

43 Claims, 13 Drawing Sheets

(56) References Cited

U.S. PATENT DOCUMENTS

| | | | |
|---|---|---|---|
| 2,497,913 | A | 2/1950 | Rines |
| 2,519,397 | A | 8/1950 | Ranger |
| 2,597,348 | A | 5/1952 | Longacre et al. |
| 2,624,874 | A | 1/1953 | Rines |
| 2,822,537 | A | 2/1958 | Bartelink |
| 2,946,996 | A | 7/1960 | Wassell |
| 3,070,795 | A | 12/1962 | Chambers |
| 3,072,903 | A | 1/1963 | Meyer |
| 3,214,755 | A | 10/1965 | Blass et al. |
| 3,267,270 | A | 8/1966 | Smidowicz |
| 3,267,271 | A | 8/1966 | Kindle |
| 3,274,593 | A | 9/1966 | Varela et al. |
| 3,448,450 | A | 6/1969 | Alfandari et al. |
| 3,697,990 | A | 10/1972 | Emch |
| 3,778,827 | A | 12/1973 | Strenglein |
| 3,971,020 | A | 7/1976 | Howard |
| 4,150,378 | A | 4/1979 | Barton |
| 5,254,999 | A | 10/1993 | Lee |
| 5,278,564 | A | 1/1994 | Groenenboom |
| 5,663,720 | A | 9/1997 | Weissman |
| 5,848,378 | A | 12/1998 | Shelton et al. |
| 5,923,285 | A | 7/1999 | Andrusiak et al. |
| 5,971,580 | A | 10/1999 | Hall et al. |
| 6,211,814 | B1 | 4/2001 | Benjamin et al. |
| 6,249,241 | B1 | 6/2001 | Jordan et al. |
| 6,832,156 | B2 | 12/2004 | Farmer |
| 6,985,837 | B2 | 1/2006 | Moon et al. |
| 7,016,772 | B2 | 3/2006 | Yanagi |
| 7,982,658 | B2 * | 7/2011 | Kauffman et al. ......... 342/26 B |
| 8,384,585 | B2 * | 2/2013 | Nohara et al. ............. 342/58 |
| 8,681,038 | B1 * | 3/2014 | Noushin et al. ............ 342/27 |
| 2003/0025629 | A1 | 2/2003 | Barrock et al. |
| 2003/0028293 | A1 | 2/2003 | Jankowiak et al. |
| 2007/0019865 | A1 * | 1/2007 | Owechko et al. .......... 382/224 |
| 2007/0146195 | A1 * | 6/2007 | Wallenberg et al. ........ 342/52 |
| 2011/0084871 | A1 * | 4/2011 | Haykin et al. ............. 342/82 |
| 2011/0205103 | A1 * | 8/2011 | Nohara et al. ............. 342/90 |
| 2013/0342380 | A1 * | 12/2013 | Nohara et al. ............. 342/90 |
| 2014/0070947 | A1 * | 3/2014 | Ionson ...................... 340/541 |
| 2014/0097979 | A1 * | 4/2014 | Nohara et al. ............. 342/90 |

FOREIGN PATENT DOCUMENTS

| | | |
|---|---|---|
| JP | 02290990 | 12/1990 |
| JP | 63-215983 | 9/1998 |

OTHER PUBLICATIONS

"An Algorithm for Tracking Multiple Targets." Reid, Donald. IEEE Transactions on Automatic Control. vol. 24, Issue 6 Dec. 1079, pp. 843-854.

"Sicom Develops Security Radar Technology." Canadian Electronics. Nov./Dec. 2003. vol. 18, No. 7.

"IMM Algorithm for tracking targets that maneuver through coordinated turns." Proceedings of the Society of Photo-Optical Instrumentation Engineers. vol. 1698. Apr. 20-22, 1992.

"The Jindakee Operational Radar Network: Its Architectire and Surveillance Capability." IEEE 1995 Conf. May 8-11, 1995. pp. 592-697. Cameron Alex.

"Development of a Virtual Radar Environment." International GeoScience and Remote sensing Symposium. vol. 6. Jul. 9-13, 2001. pp. 2599-2601. Chandraesekar et al.

"The Haida's Last Mission." The Standard (St. Catharines-Niagra) Aug. 27, 2003, pp. A1-A2. Currie, Bill.

"HMCS Haida voyage to resting berth Hamilton, Ontario . . . tracked using newest homeland security radar technology . . . " Fonthill, Ontario. Sicom Systems Ltd. Press Rel. Aug. 2005.

"Norcontrol IT Wins Major U.S. Contract"; KNC News Archive; Jun. 13, 2001.

"Litton Marine Systems Introduces New-Generation Vessel Traffice System (VTS)"; Soerry Marine News & Press Releases; Jul. 28, 2000; pp. 1-5.

"Lotton Marine Systems Suppiles VTS for River Locks in Holland"; Sperry Marine News & Press Releases; Auguse 18, 2000; pp. 1-5.

Vessel Traffic Management & Information System VTMIS5060; NOR Control IT AS; 2004; pp. 1-2.

"Low-Cost Radar Surveillance of Inland Waterways for Homeland Security Applications"; Peter Weber, et al.; Apr. 26-29, 2004; pp. 1-6.

"Multiple-Target Tracking with Radar Applications"; Samuel S. Blackman; pp. 92-107.

"Affordable Avian Radar Surveillance Systems for Natural Resource Management and BASH Applications"; Tim Nohara, et al;. 2005, pp. 1-6.

"Mathematical Techniques in Multisensor Data Fusion"; David L. Hall; pp. 1-8.

"Maritime Safety, Security, & Surveillance." Lockheed Martin Brochure. Jan. 2003. 8 pages.

"Affordable, Real-Time 3-D Avian Radar Networks for Centralized North American Bird Advisory Systems"; Peter Weber, et al. Aug. 2005, pp. 1-8.

"Multi-Mode Radar Target Detection and Recognition Using Neural Networks";Intern'l Journal of Advanced Robotic Systems; 9:177, 0-2012, 0.5772/52073. Janette Briones et al.

"Novel System Architecture & Waveform Design for Cognitive Radar Radio Networks"; Vehicular Tech, IEEE Trans. on vol. 61,No. 8, pp. 3630,3642. Oct. 2012. Nijsure, Y. et al.

"Cognitive Radar: a way of the future"; Signal Processing Mag., IEEE, vol. 23, No. 1, pp. 30,40, Jan. 2006. Haykin, Simon.

"Extended Target Recognition in Cognitive Radar Networks", Sensors, vol. 10 pp. 10181-10197, Nov. 11, 2010. Wei, Yimin et al.

"Find My Friends" iTunes Preview. http://wikipedia.org/wik/Find_my_Friends, Oct. 12, 2011.

"Latitude" iTunes Preview. http://wikipedia.org/wik/Google_Latitude, Feb. 4, 2009.

"Latitudie" iTunes Preview. http://itunes.apple.com/us/app/latitudie, May 28, 2011.

"Where are you? Show 'Em with Google Latitude" http://bits.blogs.nytimes.com/2009/02/04, Feb. 4, 2009.

* cited by examiner

DEVICE AND METHOD FOR COGNITIVE RADAR INFORMATION NETWORK

FIELD OF THE INVENTION

This invention relates to radar systems and radar information networks (RINs). The invention relates more specifically to cognitive radar information networks (CRINs) whereby human-like cognitive abilities of attention and intelligence are built into these radar systems and networks to assist operators with information overload. The invention is particularly useful for homeland security and wide-area surveillance applications where many radars and targets are present.

BACKGROUND OF THE INVENTION

The events of Sep. 11, 2001 focused the efforts of various public and private stakeholders on homeland security. Identified threats include terrorist and criminal activities, accidents and natural disasters. As described below, threats occurring on or alongside water are particularly challenging as waterways are vast in extent with large numbers of recreational and commercial vessels.

Terrorist and criminal activities can be carried out using low-flying general aviation aircraft, and vessels of all sizes from large container ships down to zodiacs and jet-skis. When the water is frozen over, snow-mobiles and vehicles add to the target mix. Awareness of what these uncooperative targets are doing at any given time and understanding whether particular target behavior is suspicious and requires closer examination is what we mean by situational awareness. Protecting people and property from threats requires situational awareness that provides authorities and citizens with timely information to prevent, respond to, and mitigate them.

From a temporal standpoint, threats can occur at any time, day or night, and are infrequent; therefore situational awareness is needed 24/7/365. Furthermore, because threats can unfold in just seconds (e.g. a vessel crosses a narrow waterway such as the St. Lawrence River and lands on the shoreline of another country violating an international border, or a vessel enters a marine exclusion zone on the waterside of a nuclear power plant on Lake Ontario), persistent surveillance is needed to provide adequate situational awareness.

From a spatial perspective, threats can occur anywhere across our vast waterways. Canada's coastline spans over 200,000 km and the world's coastlines total 356,000 km. Worldwide, commercially navigated waterways are estimated at over 670,000 km. North American international borders along waterways exceed 6,000 km and there are over 20,000 km of actively maintained commercial inland and intra-coastal waterways. The Great Lakes St. Lawrence Seaway System alone spans 3,700 km in length bringing goods to/from dozens of ports with an international border running through it, and serving an area of North American that is home to about two-thirds of Canada's population and industries, and one-quarter of the United States'.

With this background, manufacturers have responded with the development of affordable, wide-area surveillance RINs which are in the early stages of deployment to provide the required situational awareness to stakeholders. See T. J. Nohara, "A Commercial Approach to Successful Persistent Radar Surveillance of Sea, Air and Land Along the Northern Border", 2010 IEEE International Conference on Technologies for Homeland Security, 8-10 Nov. 2010, Waltham, Mass., for an overview. All radars referenced therein are candidates for improvement with the present invention. These radars include surface-mounted radars including inexpensive and fixed, marine radars, agile radars and air traffic control radars, military radars, mobile radars, ship-based radars and aerostat radars.

In parallel with the above development, researchers have begun studying ways to develop knowledge-aided systems for use in adaptive radars with the hope of better performance. The underlying idea here is to allow radar processing algorithms to adapt on the fly (instead of being hard-coded) to improve detection performance; in a word, to add an "intelligence-like" capability to a radar. A book by Joseph Guerci entitled Cognitive Radar: The Knowledge-Aided Fully Adaptive Approach, Artech House, 2010 provides a treatment of knowledge-aided adaptive radars directed primarily to expensive, coherent, military radars with multi-element antennas and multi-channel receivers such as airborne GMTI (ground moving target indication) radars. This work exploits the fact that land clutter, including large discrete reflectors (e.g. bridges, train tracks), nonhomogeneous littoral clutter and highways with numerous vehicles cause problems for adaptive radar processing algorithms that rely only on radar measurements. His approach is to exploit prior, external, geospatial knowledge of these scattering features by predicting ahead a few seconds where the airborne radar will be looking and altering the radar processing algorithms accordingly to account for the geospatial characteristics that will be encountered there.

The IEEE Signal Processing Magazine, Volume 23, Number 1, January 2006 devotes an entire issue to this subject, including a paper from Simon Haykin entitled "Cognitive radar: a way of the future" where a bat's echo-location applied to tracking and homing in on an insect (dinner) motivated the idea of a closed feedback circuit between the transmitter, the environment and the receiver of a radar. Haykin identifies a wide-area radar network as a challenging problem and questions how to design one with cognition. This same sentiment is echoed in his article, Point of View: Cognitive Dynamic Systems, Special Issue, Proceedings of the IEEE, Volume 100, Number 7, July 2012.

Haykin subsequently provides a principled and theoretical foundation for developing cognitive dynamic systems in his book *Cognitive Dynamic Systems, Perception-Action Cycle, Radar And Radio*, Cambridge University Press, England, March 2012. He formalizes cognitive radar as needing to be based on the functioning of the human brain to be truly cognitive; and affirms the perception-action-cycle, memory, and the characteristics of attention and intelligence as necessary features of cognition. Attention and intelligence are algorithmic in nature and left as loose ideas that require application-specific future development. On a more practical level, Haykin focuses on the single radar, single target tracking problem with the objective of developing cognition to improve track quality for which he demonstrates feasibility through some basic computer simulations.

The invention described herein builds on this prior work by developing cognitive radar information networks, extending Nohara's RINs and Haykin's ideas on cognitive dynamic systems.

OBJECTS OF THE INVENTION

It is an object of the present invention to provide improved state-of-the-art radar systems and radar information networks with human-like cognitive abilities of attention and intelligence.

It is a primary object of the present invention to provide practical, cognitive radar information networks that provide improved performance over radar information networks.

A primary object of the current invention is to provide the operator with means to manage information overload in dense target environments and because of the presence of multiple radars in a radar information network.

Another object of the current invention is to provide the operator with means to more easily identify suspicious activity.

Another object of the present invention is providing the radar system with the automatic means of intelligently responding to environmental disturbances such as weather.

Yet another object of the present invention is to provide the operator with the means of more easily controlling the setup of a radar system or network.

A key object of the present invention is to provide the operator with the means of automatically causing the radar system's attention to focus on one or more areas of interest while not overly compromising performance elsewhere.

A related object of the present invention is to provide the radar network with the means to automatically focus attention on situations of interest.

Another related object of the present invention is to provide the operator with the means of temporarily altering the radar mission by departing from the steady-state operating baseline configuration of the radar network in favor of another.

A key object of the present invention is to provide a radar system or network with the means for automatically learning from the environment itself the coverage afforded by the radar for particular targets.

A related object of the present invention is to provide a radar with the means of automatically developing dynamic target maps based on targets of opportunity observed in the environment in order to teach itself its own effective coverage patterns.

Another object of the present invention is to provide a radar system or network with the means to automatically learn from the consequences of the actions it or the operator takes in optimizing its performance.

Another object of the present invention is to extend the prior art on cognition for single target tracking to multiple target tracking.

Yet another object of the present invention is to extend the prior art on cognition for single radar sensors to radar information networks with multiple radar sensors.

A further object of the present invention is to extend the entropic state for cognitive control from a single radar, single target model to a radar network with multiple radars and multiple targets.

A final object of the present invention is to serve as a force multiplier, reducing the number of operators required to manage and operate a radar information network.

These and other objects of the invention will be apparent from the drawings and descriptions included herein. It is to be noted that each object of the invention is achieved by at least one embodiment of the invention. However, it is not necessarily the case that every embodiment of the invention meets every object of the invention as discussed herein.

SUMMARY OF THE INVENTION

The events of 9/11 have made it necessary for officials to protect their citizens by affordably monitoring potential threats on or alongside vast waterways, such as the 3,700 km long Great Lakes St. Lawrence Seaway System, which is occupied by large numbers of non-cooperative recreational and commercial vessels, snowmobiles (in winter), and low-flying aircraft.

Characteristics of wide-area RINs lead to some new operator issues not encountered before. These challenges, referred to herein as the operator overload problem, arise from the vastness of the areas covered, the large number of friendly targets present, and the large number of radars to be controlled. Examination of this problem leads to the recognition that these $21^{st}$ century radar networks such as those described by Nohara et al. in U.S. Pat. No. 7,940,206, Low-Cost High Performance Radar Networks, which is incorporated herein by reference, would benefit significantly if the operator's cognitive abilities of attention and intelligence could be built into these radar networks. The invention described herein provides preferred implementations for such CRINs.

CRINs, in accordance with the present invention, learn from the environment and past operator decisions in order to address operator overload and risk management principles. In addition, they can automatically focus system resources (i.e. apply attention) on areas of heightened interest, while maintaining acceptable system performance elsewhere (i.e. attention is applied intelligently). This unique and novel definition and use of attention brings practical benefits. For example, attention can be applied to particular areas when (a) INTEL (i.e. law enforcement intelligence obtained from another source) indicates an illegal activity is going to take place there; (b) a covert operation is underway there; (c) an accident or incident has occurred there; (d) the system detects suspicious activity or activity of interest (e.g. border crossing) there; or (e) when a high-risk event could result such as during VIP (i.e. Very Important Person) events or LNG (i.e. Liquid Natural Gas) tanker transits. Attention can be affected by increasing the CRIN's sensitivity in the areas of interest, thereby increasing the detectability of smaller/weaker targets and improving track quality.

CRINs are preferably built upon wide-area RINs as described further herein, thereby leveraging existing radar installations. While a CRIN could consist of a single radar node, typically, a large number of nodes is required to cover the wide area of interest, consisting of a number of inexpensive ground-based radar sensors mounted on structures around the large waterways they intend to provide surveillance coverage for. The structures include towers, roof-tops, tripods on the ground, tethered aerostats, and even mobile structures such as trucks on land or vessels on the water. Such a network is illustrated in FIG. 1 (described later) and further described in T. J. Nohara, "A Commercial Approach to Successful Persistent Radar Surveillance of Sea, Air and Land Along the Northern Border", 2010 IEEE International Conference on Technologies for Homeland Security, 8-10 Nov. 2010, Waltham, Mass., and in U.S. Pat. No. 7,940,206.

The arrangement of radar nodes and the coverage afforded by each are typically designed to overlap so that seamless coverage is available across the wide area of interest; i.e. a combined surveillance volume is obtained. In this way, targets moving anywhere through-out the entire area will be picked up by at least one radar sensor node. At each sensor node, the radar typically scans 360°, and uses its transmitter to interrogate the environment with a selected waveform. Its receiver picks up reflections or echoes from targets and clutter in the environment, and processes them, using a particular receiver processing mode, to automatically extract information from each target in the environment. The extracted information is referred to herein as target data, and typically consists of both detections and tracks.

Target data typically include an estimate (also referred to as a measurement) of target parameters updated every couple of seconds. These parameters preferably include {latitude, longitude, altitude, speed, heading, size}. Size is typically based on radar cross section (RCS). At any instant in time, the current target data represent the locations, dynamics and sizes of all targets seen by the radar network. Over time, complete trajectories are extracted or formed for each target indicative of target behavior. Target data are typically sent over standard computer, cellular or satellite network links (wired or wireless) to an information system or repository that stores forever, organizes, and relays desired target data to operators/users in real-time. For the purpose of simplifying the discussion below, the information system will be considered centralized without loss of generality, recognizing that by simple network routing, distributed information systems, processors, and servers, known to those skilled in the art, can replace the centralized ones for most practical purposes.

Remote users (located anywhere there is network access to the radar network in general, or its information system in particular) are also preferably provided with a number of applications (software) which query the information system for both real-time or historical target data, including post-processed target data. A host of target data processors can access the information system over the network, generate a variety of information products (e.g. traffic patterns, border-crossing statistics, suspicious behavior alerts, marine exclusion zone violations around critical infrastructure, etc.), and make these available to users as well. Information sent to users support a variety of user missions including surveillance, automated alerting of suspicious activity or activity of interest, interdiction, intelligence, investigations, analysis, prosecution and research.

CRINs, in accordance with a feature of the present invention preferably allow owners of radar nodes to share any subset of their target data with others, creating virtual radar information networks (VRINs) that span political boundaries, for example. Standardized, open interfaces allow authorized users the ability to access shared target data and generate their own information products behind their own respective firewalls for information privacy and policy purposes. Such VRINs are believed to be particularly valuable in joint law enforcement operations, and are cost-effective as users can leverage deployed sensors from others.

The modular nature of the CRIN preferably includes flexibility in selection of platforms, transceivers, and antennas to address coverage and performance requirements; and software definable radar processing algorithms suitable for target extraction of surface and air targets of interest. Typical radar sensors include X or S-band marine radars with a rotation rate typically in the 24-48 RPM range. Conventional magnetron radars typically include three waveforms: a short-pulse (SP), high-range resolution waveform (e.g. 10 m), a medium-pulse (MP), medium range resolution waveform (e.g. 50 m), and a long-pulse, low-resolution waveform (e.g. 150 m). Solid-state, Doppler marine radars can also be used. A SP waveform is typically available; and rain and sea clutter suppression is afforded by Doppler processing. Radar remote controllers are available which allow transmitter illumination and receiver processing mode to be changed under remote software control (see U.S. Patent Application Publication No. 2011/0205103).

The COTS marine radars typically come with horizontally-rotating array antennas that provide a horizontal beam width typically between 0.3° to 3° and a vertical beam width typically 20° wide and oriented as +/−10°. These 2D radars cannot provide altitude information in their target data. Marine radar transceivers coupled with custom-developed, agile pencil-beam antennas can also be used to provide altitude information for airborne targets, and can be commanded under software control, in accordance with the present invention, to follow an airborne target such as a low-flying aircraft.

Specialized, military or coherent, 3D radars are also available in some cases and can integrate with the CRINs considered here. In such cases, phase information may be available in the target data as well. Such radars include the aforementioned GMTI radars.

To re-cap, the wide-area CRINs of the present invention can include a heterogeneous mixture of existing and/or new radars, mostly marine radars, which may not be synchronous (as the aforementioned cognitive radars of Haykin require), but which can operate independently as described above and form one or more VRINs shared with one or more parties. They will provide target information in a common format to a target information system (centralized or distributed) so that integrated situational awareness can be provided. New radar technologies will build upon such RINs to provide new capabilities.

CRIN Operator Overload Mitigation

With conventional military or air traffic control (ATC) radars, operator overload is mitigated by employing dedicated and highly-trained radar operators, and making targets of interest (TOIs) cooperative so that they can be assigned and managed. In military scenarios, identify friend or foe (IFF) transponders installed on friendly targets allow operators to automatically distinguish friendly radar target tracks from enemy tracks or false tracks caused by clutter. Civil aircraft carry transponders to allow air traffic controllers to do the same. The air space or maritime operating areas are also controlled so that targets that should not be there stay out. Dedicated radar operators ensure their respective radars are optimally tuned for detecting and tracking their respective TOIs under different environmental conditions.

This is not the case for CRINs as recognized by the present invention. It is the non-cooperative targets (i.e. targets that do not carry transponders to make them identifiable) that are of most interest, and especially the small ones which are most difficult to detect and track with radar at further distances. Furthermore the area of interest is not controlled, so thousands of commercial and recreational targets are present. Finding suspicious targets is like looking for a needle in the haystack. In addition, the vastness of the area covered by the radar information network, and the number of (dissimilar) radars involved make optimizing radar sensitivity to specific developing situations particularly challenging. It is no longer a simple task of a dedicated operator adjusting the gain-control knob on a single radar in order to increase its sensitivity. Now, a network of remote radars needs to be intelligently adjusted to focus attention in a particular localized area where it is needed at a particular time. If ignored, the above issues will lead to either operator overload or result in a limit in system performance that is otherwise achievable with the features of the present invention. By addressing these issues, CRINs significantly enhance the price/performance/complexity advantages of radar information networks; and help operators to be more productive by focusing on tasks best suited to their skills.

No one today would deny the informational, communication, and joint/common situational awareness that the Internet brings to people around the world, including law enforcement personnel. This wide-area computer information network, while organizing information on a scale never before imagined, brings with it a major information overload problem. How do different users find the information they are interested in when they need it? The answer lies in algorithms that continually crawl the web, identifying new content and network behavior, indexing and organizing the information so that it is searchable, and providing search engine tools and an ecosystem of applications to help users quickly get what they need when they need it. CRINs apply an analogous methodology in accordance with the present invention, albeit on a much smaller and unique scale. To maximize situational awareness and situation understanding, the information content (including targets and disturbances such as clutter) of the environment are continuously analyzed and indexed or organized to automatically learn from the environment, with tools provided to assist operators in exploring, discovering and finding what they need when they need it.

The human brain is the most powerful, highly distributed information-processing machine, particularly so when the requirement is to deal with complex cognitive tasks, exemplified by visualization and control. In this context, there is much that we can learn from the visual brain in designing a new generation of CRINs.

If we had enough of them, and if they had the time, experienced and dedicated radar operators have the required cognitive abilities to focus attention where it is needed, and the intelligence to learn from the environment and trade-off how best to keep the radar network optimized for changing security situations; i.e. changing missions. CRINs overcome this requirement by incorporating specially-designed cognitive processes to perform these functions, as described further herein.

Hence, a CRIN can be viewed as a significant "force multiplier". In other words, the cognitive radar information network would make it possible for the operator to be more efficient and effective by drawing attention to different localized areas of interest across and around border regions, for example.

State-of-the-art RINs would typically be deployed and tuned to baseline operating conditions. If conditions never changed, there would be no need (for an operator) to change radar network settings. However, in practice, changes in the environment occur which are referred to herein as unexpected or uncertain events. CRINs are able to respond to such events, in accordance to this invention, by automatically focusing attention to localized areas, intelligently, i.e. without compromising the overall performance of the radar network, and by automatically adjusting network settings in response to environmental conditions as described further below.

Two classes of events are described below, which motivate the case for investing in the development of cognitive radar information networks (CRIN). The provided examples illustrate the points and are not intended to be limiting in any way.

The first class of events leads to an automatic CRIN response not requiring operator intervention, thereby mitigating operator overload. Based on the location and nature of the event and past experience gained by the CRIN, the operator is alerted to the event and appropriate radar sensor nodes are automatically adjusted (e.g. a particular transmitter waveform and/or associated receiver processing mode is selected for use) to robustly focus system attention or optimize performance where needed. Suspicious targets as well as environmental disturbances fall into this first class of events. The second class of events is operator driven. Both classes of events are described further below.

First Class: Suspicious Targets

The CRIN will automatically detect suspicious targets around particular areas of interest such as border crossings, or marine exclusion zones (MEZ) around critical infrastructure such as a nuclear power plant. A rendezvous, as well as other abnormal behavior such as deviation from regulated routes, will be detected by the CRIN; then the operator will be alerted, and the CRIN will automatically adapt itself to bring attention to such areas to reduce operator overload and/or enhance performance. Detecting such suspicious behaviors is particularly difficult for operators, especially as they occur within dense traffic environments, and may take considerable time and concentration to observe.

For example, consider the typical traffic pattern for a summer afternoon on the west end of Lake Ontario. Thousands of target tracks would be evident over this period of time. A suspicious target taking an unusual several-hour journey would be buried in this sea of targets and be very difficult for an operator to recognize. The unusual behavior may even cross an operator shift-change, making it even more difficult to notice.

An operational RIN picked up such a vessel which left the Port of Hamilton, headed east and crossed the border well into the United States, did a turn around and headed back into Canadian waters, and then headed south into the Welland Canal. Within the same four-hour time period, another large vessel left the Port of Hamilton, headed east towards the border, then looped back and returned to the Port of Hamilton. While the two vessels did not rendezvous, their paths did cross and they did behave suspiciously. It would be extremely difficult for the operator to pick this out in real-time, and make adjustments to the configuration of the radars in the network, if required, in order to draw more attention. In this case, drawing more attention could mean improving tracking performance by using a different receiver processing mode for one or more radar nodes, and/or increasing resolution by using a different transmitter illumination for one or more radars, to see for example, whether the larger vessel came very close to a smaller one. This is an example where cognition can help to assist the operator and reduce information overload. A CRIN, in accordance with the present invention, would detect the suspicious activity and automatically apply attention by adjusting relevant radars.

First Class: Environmental Disturbance

Environmental disturbances include weather (e.g. precipitation) which can lead to the appearance of "false" targets in localized areas, and sea/lake clutter variations which result in reduced radar sensitivity and/or increased probability of false alarm (PFA). Such disturbances are typically isolated to relatively small areas in comparison to the total coverage area; and they typically move or change with the predominant winds, which for Lake Ontario are westerly.

If one watches these precipitation cells in time on Lake Ontario, they will move from west to east in response to the local winds patterns. The CRIN is able to detect the presence and location of such disturbance areas and alert the operator that performance is affected there.

Then the CRIN could reduce attention in those areas if requested to reduce operator overload, or alternatively, enhance performance there by switching waveforms or changing receiver processing mode while keeping the operator informed. In addition, the CRIN can manage the system optimizations in a dynamic manner (i.e. in synchrony with the movement of the disturbance) to reduce operator overload while maintaining operator awareness.

Second Class: Operator Driven Events

The second class of events is operator driven. In this case, the operator has knowledge of an unfolding situation and wants the CRIN to robustly focus attention in a designated area or areas for some period of time. The following are examples of operator-driven events:

Intelligence indicates that an illegal transaction is likely to take place in a certain area and extra sensitivity is need for evidence and prosecution;

law enforcement personnel are conducting a covert surveillance operation in an area and want increased sensitivity;

there has been an accident on the water with a small vessel and search and rescue personnel require focused attention to find the drifting vessel or wreckage; and a particular target, e.g. an LNG tanker, is moving through the wide-area and a high-sensitivity region or protective bubble-zone around the target is desired throughout its journey.

For both classes of events, the CRIN must continue operating robustly in its primary surveillance mission, notwithstanding the fact that it is making changes to the baseline operating state of the network, by changing in a localized manner, the transmitter illumination and/or receiver operating mode of one or more radars. In accordance with a feature of the present invention, operators are able to define global and regional performance figures of merit (FOMs) that are maintained during the application of attention to designated areas of interest. Areas or cells available for increased attention can be pre-defined as illustrated in FIG. 1, allowing the CRIN to gain experience by learning from its environment. The FOMs might be based on a multi-target tracking continuity measure applied to a given attention cell, for example. The FOMs ensure that global target sensitivity does not degrade below some specified level, while particular regional areas may have different performance thresholds that must be maintained. It is all about exploiting the available system resources associated with the network of radars in the best manner possible to meet mission requirements. For suspicious targets or disturbances that are dynamic and move over large areas, the attention cells will change over time while the CRIN maintains its surveillance mission.

For CRINs that include agile radar sensors as discussed earlier, the CRIN can preferably be tasked with locking onto a designated, high-risk TOI such as a low-flying aircraft headed towards an urban area, and sacrificing surveillance for a short period of time to maintain target lock.

Convergence between radar sensing, communications, and information technology during the past 20 years has lead us to spatially distributed, heterogeneous radar information networks that we believe will grow in dominance and utility in the 21st century. From a technology stand point, the invention described herein introduces powerful, cognitive capabilities that will be built into our surveillance machines. The inventors believe that their novel vision for cognitive radar information networks presented herein will excite additional innovations across human and machine sciences during the early part of this century.

A cognitive radar information network system, in accordance with the present invention, comprises at least one radar sensing node, the environment, a repository (also referred to as memory), and a cognitive radar controller, said radar sensing node consisting of:

a transmitter for illuminating a respective surveillance volume of said environment with a radio frequency (RF) waveform emitted through a transmitting antenna operatively connected to said transmitter; and a receiver operatively connected to a receiving antenna for receiving echoes from targets and clutter in said environment in response to said emitted waveform, said receiver further comprising a digital radar processor for generating receiver information from said echoes about said environment;

said repository configured for receiving and storing said receiver information;

said cognitive controller configured to focus said system's attention on a region contained within said surveillance volume in response to an attention request, wherein said attention results in improved surveillance performance in said region, and where said focusing of said attention is achieved by one or more actions taken from the group consisting of selecting said transmitter's waveform, selecting said receiver's processing mode, and controlling said transmitter's antenna; and where said cognitive controller is further configured to select and take its actions in an optimal manner by learning from the environment and the consequences of its past decisions, said learning from the environment achieved by using the historical receiver information of said repository, and said past decisions being those said actions previously taken and said consequences being the resulting effect on surveillance performance in respective region of said actions.

A related method for intelligently focusing the attention of a radar surveillance system on a region of interest contained in the surveillance volume, in accordance with the present invention, comprises:

operating a cognitive radar controller to receive and process an attention request;

said processing of said attention request including the steps of selecting an optimal action from a set of possible actions and executing the selected action, said selected action being associated with at least one selected radar surveillance sensing node and taken from the group including: selection of transmitter waveform, selection of receiver processing mode and controlling of transmitter antenna for each respective selected radar sensing node;

said selecting of an optimal action further comprising learning from the environment and the consequences of past decisions, said learning from the environment achieved by exploiting historical target information provided by said radar surveillance system to characterize expected performance, said past decisions being those said actions previously taken and said consequences being the resulting effect on surveillance performance in respective region of interest associated said respective past actions; and said executing of said selected action comprising the steps of requesting said selected radar sensing node to change its respective configuration in accordance with said selected action.

DEFINITIONS

Figure 1:
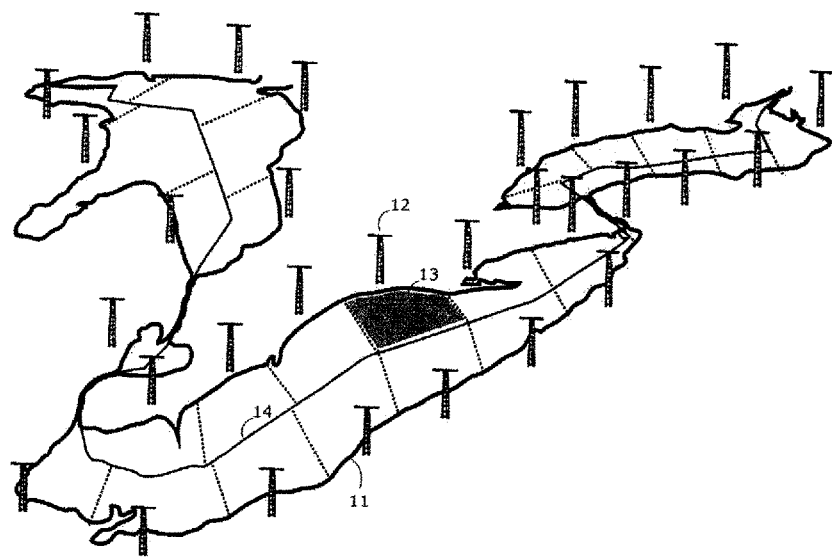
FIG. 1 is an illustration of wide-area radar information network for the Great Lakes with pre-defined attention cells.

The term "radar node" is used herein to denote a radar surveillance apparatus that monitors an area and detects and tracks targets there. A radar node as used herein includes surface mounted radars, marine radars, agile radars, air traffic control radars, military radars, mobile radars, ship-based radars, and aerostat radars. Each radar node consists of one or more antennas, transmitters, receivers, and radar processors.

The term "target information" is used herein to denote automatically generated target data such as track data providing trajectory information on detected targets, and may also include size information and a variety of other information, such as detections, AIS, ADS-B and camera information, as well as information provided by other persons and other sensors.

The term "radar information network" is used herein to denote a wide-area surveillance system consisting of multiple radars, each a radar node, interconnected and sharing its target information to provide a larger surveillance volume than any one radar node can itself provide. Target information can be retained by the radar information network as used herein in a variety of ways, including a target information system or other repository or repositories centralized or distributed across the radar information network, where information can be accessed by users as well as system elements.

The term "virtual radar information network" is used herein to denote a radar information network formed by the sharing of target information obtained from a set of radar nodes owned by multiple parties. As used herein, these multiple parties may be from different agencies or even different countries so that the resulting virtual networks can even span political boundaries.

The term "cognitive radar information network" (CRIN) is used herein to denote a radar information network or virtual radar information network that has the capability to learn from the environment and past operator decisions in order to address operator overload and risk management principles. In addition, a CRIN can automatically focus system resources (i.e. apply attention) on areas of heightened interest, while maintaining acceptable system performance elsewhere (i.e. attention is applied intelligently).

The term "surveillance volume" is used herein to denote a region or volume that is to be surveyed or monitored by a surveillance sensor such as a radar node.

The term "combined surveillance volume" is used herein to denote the combined region or volume that is surveyed or monitored by a radar information network. It represents, for example, the union of surveillance volumes or some other combination of surveillance volumes of respective radar nodes.

The term "figure of merit" is used herein to denote a performance metric associated with a cognitive radar information network. A variety of performance metrics can be used including those that measure global performance (e.g. performance in the combined surveillance volume) as well as local or regional performance (e.g. performance in the surveillance volume associated with a particular radar node). As used herein, metrics can include target sensitivity, target track continuity, estimation errors, etc.

The term "attention cell" is used herein to denote a particular region or volume within the combined surveillance volume of a cognitive radar information network where the CRIN is to focus its attention or resources. Attention cells can be predetermined, by dividing up the combined surveillance volume into a collection of attention cells, or they can be determined automatically by the CRIN in response to a suspicious target or environmental disturbance, or in response to an operator driven event.

The term "cognitive controller" is used herein to denote the brain of a CRIN. It has the means to automatically focus attention on situations of interest and to automatically learn from the consequences of the actions it takes or the operator takes in optimizing CRIN performance. The cognitive controller balances system constraints in its decisions, such as bandwidth constraints, computational loading, and figures of merit. The cognitive controller selects appropriate radar sensor nodes and automatically adjusts radar characteristics such as transmitter waveform and/or associated receiver processing mode to robustly focus system attention or optimize performance where needed. Situations of interest include suspicious targets, environmental disturbances, and operator-indicated situations.

The term "adaptive target map" is used herein to denote an environmental information quantity that can be generated based on targets of opportunity observed over short-term and seasonal time frames. Adaptive target maps can be generated for an arbitrary surveillance volume or region, or more particularly, for each attention cell, with specific maps generated versus each radar node's available Transmitter modes and Receiver modes. Adaptive target maps provide the means for automatically learning from the environment itself the effective coverage afforded by each radar for particular targets. Adaptive target maps can be further organized by target attributes such as target size, speed, direction, or acceleration, and further subgrouped in accordance with environmental attributes such as weather or propagation conditions. Target maps are updated on-the-fly or periodically at any rate or rates, and stored for rapid recall by the CRIN and its cognitive controller.

The term "excluson zones" is used herein to denote areas where targets of interest are not allowed to be in, such as marine exclusion zones which may mark the waterside access to a nuclear power plant or other facility or critical infrastructure such as a bridge or water intake, or which may take the form of an area containing an international border, for example.

DETAILED DESCRIPTION

The wide-area, combined surveillance volume 11 covered by the CRIN is illustrated in FIG. 1. The CRIN is made up of a number of radar nodes 12 whose individual surveillance volumes combine to provide the wide-area coverage needed for the example Great Lakes region which contains the Canada/United States border 14 running through the middle of it as shown in FIG. 1. The combined surveillance volume 11 is preferably divided up into a number of virtual, geographical, attention cells 13 as illustrated in FIG. 1. The CRIN operates with a baseline radar configuration and performance (the operating baseline may change with season). Attention is applied to one or more requested cells 13 while intelligence ensures that surveillance in the remaining cells 13 continues to function robustly. Robustness preferably includes both global and local cell metrics—i.e. global performance is controlled so that it will not degrade below a certain threshold; and individual local cells are controlled so as not to degrade below respective performance thresholds.

A cell 13 may be designated for added attention by: (1) the operator, or (2) automatically by the CRIN's cognitive controller 23 (or an Automatic Behavior Analysis and Detection Processor 32). Both the cognitive controller 23 and the operator provide intelligent feedback to the system. In one case, the operator may see a situation first that requires attention; in another, the cognitive controller 23 may deduce a situation (e.g. due to a disturbance such as weather or a potentially suspicious behavior detected) that results in attention being designated for one or more cells.

Using pre-defined attention cells 13 allows the CRIN to build up knowledge and experience in relation to each cell 13 so that the cognitive controller 23 can act quickly and robustly, on-the-fly, when attention is needed in a certain area. While the aforementioned approach is preferable, it is obvious to one skilled in the art that arbitrary attention cells 13 can be used in practice, generated in response to a particular situation or by request of the user.

An area of focused interest may move with a target as the target journeys (like a protective bubble), causing cells needing attention to change automatically in time. Even weather cells move—hence, the cognitive controller 23 can use its intelligence to automatically adjust the cognitive radar information network on-the-fly in response to such TOIs or weather disturbances.

Cognition may also be applied to the problem of detecting suspicious target behavior, in order to assist the operator and reduce information overload, especially in dense target environments. The system could also automatically propose new scenarios not described previously by the operator, but determined by the CRIN to be anomalous, through its gained experience. For example, the CRIN could learn from past behavior that a particular type of target has never been observed in a cell 13 or area where it is now detected.

Even a single target of interest will occupy a region over a period of time (because it moves). Furthermore, situations of interest such as border crossings, loitering in a marine exclusion zone, or a target deviating from a regulated laneway all occur in geometric regions. These regions have physical extent and shape in space. We call them geometries. Hence, activity around such a geometry can be emphasized by applying attention to the cell or cells containing it.

If an agile radar node provides coverage in a region of interest (such as a radar which scans in azimuth and elevation as described by Nohara et al in U.S. Pat. No. 7,864,103 entitled Device and Method for 3D Height-Finding Avian Radar which is incorporated herein by reference), then the cognitive controller 23 could also cause the agile radar to adjust its elevation scan pattern to lock on and stay with a target of interest such as a low flying aircraft, especially if the target is behaving suspiciously.

Dividing up the area into cells 13 where attention can be applied fits the surveillance nature of the radar information network, and represents a divide and conquer approach to computational efficiency; i.e. parallel processing known to those skilled in the art can be easily employed by assigning the processing associated with groups of cells to different computing elements in the system.

Various divide and conquer strategies similar to those used in the brain can automatically assist in the target information processing. For example, automatic deduction could be applied using target subspaces developed by grouping targets with similar attributes (e.g. RCS or speed, acceleration, location, radar node number, . . . ) and then looking for suspicious behavior against a number of operator-described scenarios. Each scenario could be described using geometries (e.g. a border crossing zone, an MEZ, etc.) and behavioral criteria (e.g. loitering, rendezvous, departure from expected routes, AIS turned off, etc.).

Figure 2:
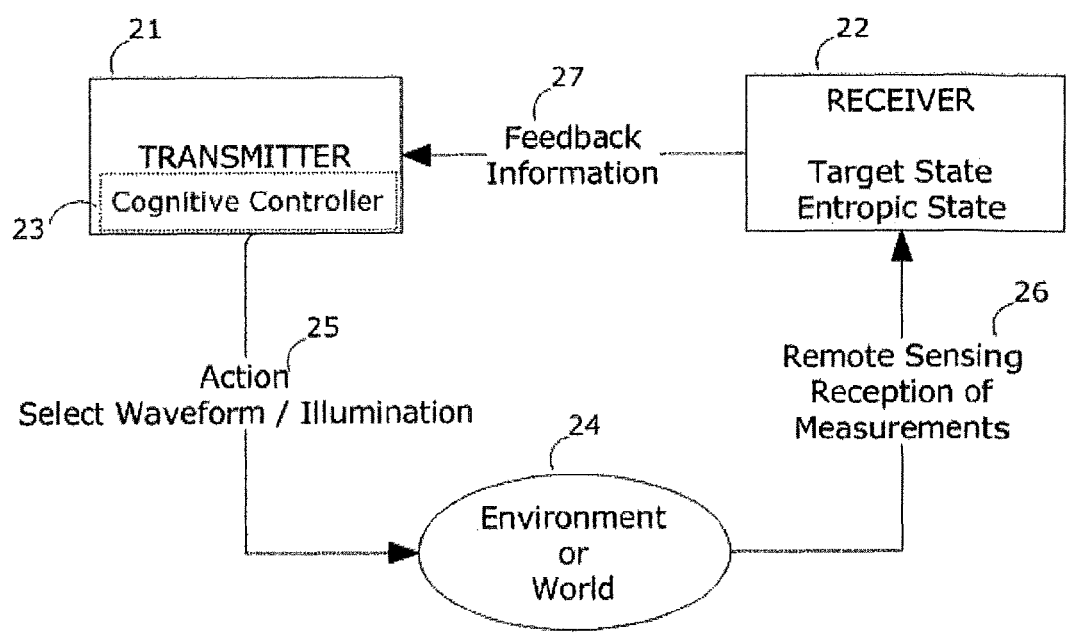
FIG. 2 is a block diagram of the perception-action cycle for a single cognitive radar.

FIG. 2 illustrates the first step towards a cognitive radar with a single Transmitter 21 and Receiver 22 that incorporates a perception-action cycle similar to that used in the brain. During each cycle of the perception-action cycle, the Transmitter 21 carries out an Action 25, namely, it transmits a waveform 25 to illuminate the environment 24, the Receiver 22 receives measurements 26 from the environment, and provides feedback information 27 about the environment 24 back to the Transmitter 21, which is used by the Transmitter's Cognitive Controller 23 to adaptively (based on learning) select a new (potentially different) illumination 25 to be applied for the next perception-action-cycle. Traditional radar (without cognition) does not have the feedback path between the Receiver and Transmitter and does not learn from experience how to best select a new illumination. As used herein, waveform and illumination are used interchangeably unless the context dictates otherwise.

The radar environment or world includes two sources: unknown targets and disturbances such as clutter (e.g. precipitation, sea/lake clutter) and thermal noise. Targets are deterministic in the following sense. There is a certain number of them, and each one has a particular location, speed, heading and RCS at each time instant. What we have described here is unknown. Though targets are deterministic, since they are unknown, they represent a source of uncertainty. On the other hand, disturbances are stochastic in nature. Disturbances and uncertainties are responsible for state estimation errors.

The Receiver 22 extracts information from the measurements 26 it receives about the world. In particular, and in accordance with a unique feature of the present invention, it computes or estimates two states associated with the world at each particular time update t: (1) the target state of the world represents its knowledge of the multiple targets present at time t, and the entropic state of the world which represents the disturbances in the world, along with the imperfections associated with its target knowledge (as represented by the target state). The entropic state is associated with the target state estimation error. Entropy is a metric for assessing the quantity of information we are lacking—hence the name entropic state. The Receiver 22 is assumed to have memory to store the target state and entropic state forever (i.e. not necessarily forever but a long time or indefinitely), or alternatively, sends this information to a central location or repository for storage.

The Transmitter 21 does not see (i.e. sense) the environment 24 directly; rather, it illuminates the environment. As a result, if it is to learn from the environment in order to select an appropriate illumination in an intelligent manner, it must see the environment through the Receiver's eyes. This seeing is implemented through the feedback path 27 from the Receiver 22 to the Transmitter 21, which is a key characteristic of cognitive radar systems.

Humans learn how to make good, robust decisions from past experience; also they remember their consequences. The Transmitter 21 (or some central computer where the Transmitter's Cognitive Controller lives, in accordance with the present invention) is afforded with memory so that it can learn from its past illumination-selection decisions and their impact on each attention cell 13. The Feedback Information 27 is based on the current Receiver measurements (typically predicted forward to the next time step) and/or the entropic state which the Cognitive Controller 23 uses in its algorithms to make a robust illumination selection.

With the basic cognitive radar structures defined in FIG. 2, it is appropriate to summarize key operating principles of cognitive dynamic systems and identify those structures in the present invention which are largely responsible for such capabilities.

1. The principle of information preservation recognizes that measurements contain important information about the world that should be preserved for present and future exploitation. The Receiver 22 which produces these measurements will retain this information in a local memory store, and/or send it to a central repository 41.
2. Like human memory, the task of cognitive memory is to predict the consequences of action 25 taken by the Transmitter 21 in the most reliable manner through a continuous learning process from one cognitive cycle to the next. Cognitive memory can be supported in the Receiver 22 and Transmitter 21 or via a central repository 41 with linkages to both the Receiver 22 and Transmitter 21 decisions.
3. Attention, in accordance with the present invention, is that cognitive algorithmic capability which allows a cognitive radar to focus its resources (illumination, sensing, and information processing) on a situation of interest involving a subgroup of targets. This capability helps operators manage or ease the information overload which results from surveillance in wide-area, dense target environments.
4. Intelligence, in accordance with the present invention, is that cognitive algorithmic capability that enables the Transmitter 21 to select both a particular illumination and Receiver operating mode in a robust manner in the face of environmental disturbances and uncertainties. Robustness means that system performance will not degrade below a certain level in areas not subjected to increased attention.

Figure 3:
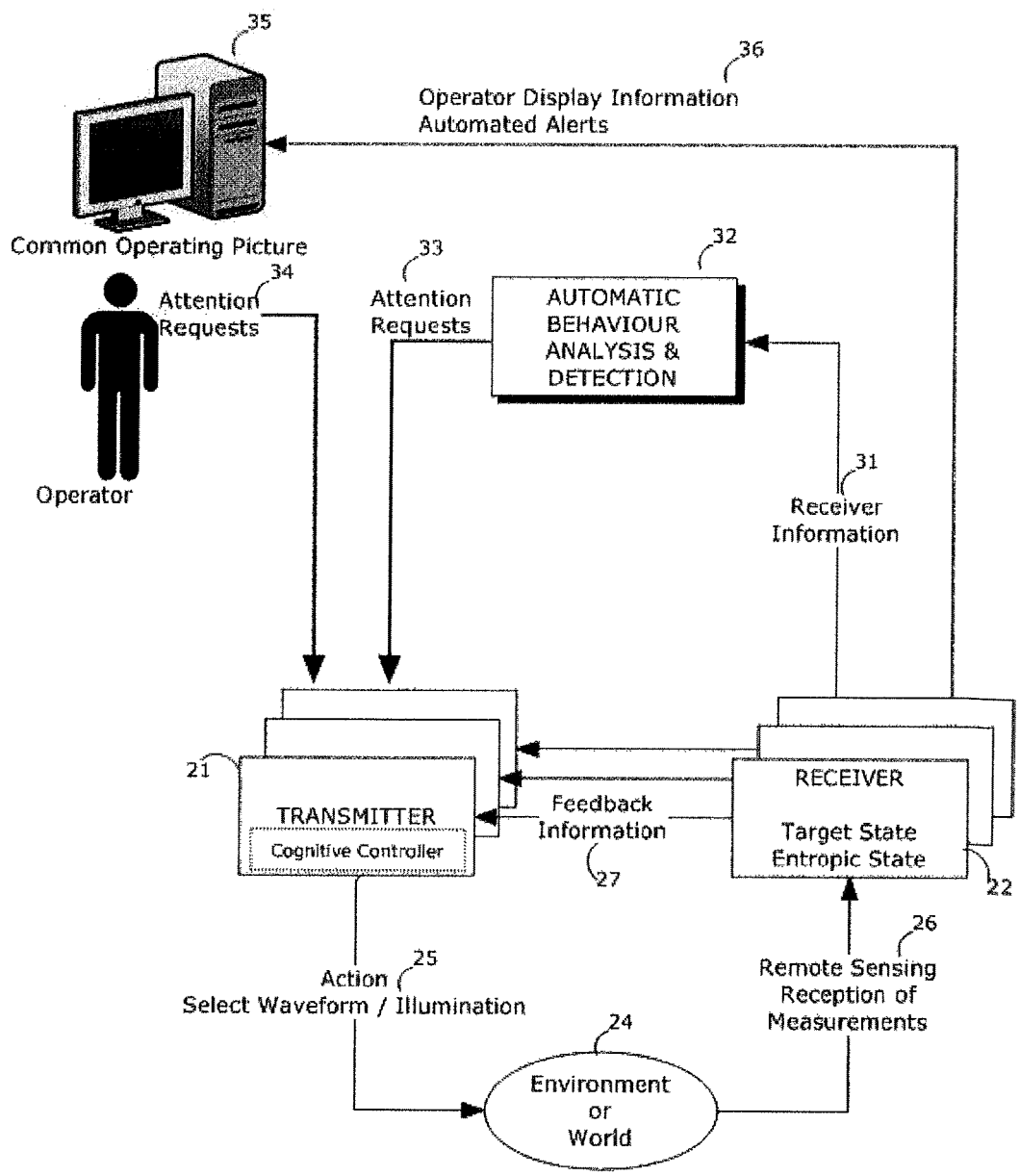
FIG. 3 is a block diagram of a cognitive radar information network (CRIN) in accordance with the present invention.

The single cognitive radar can be expanded and extended into a cognitive radar information network (CRIN) as illustrated in FIG. 3. The perception-action-cycle feedback paths for each radar node are explicitly shown. However, if one takes advantage of the ability of modern RINs to organize their Receiver information 31 in a central (or distributed) repository 41 (by having each Receiver send its information in real-time there), then FIG. 3 can be significantly simplified producing FIG. 4, in accordance with the present invention.

Figure 4:
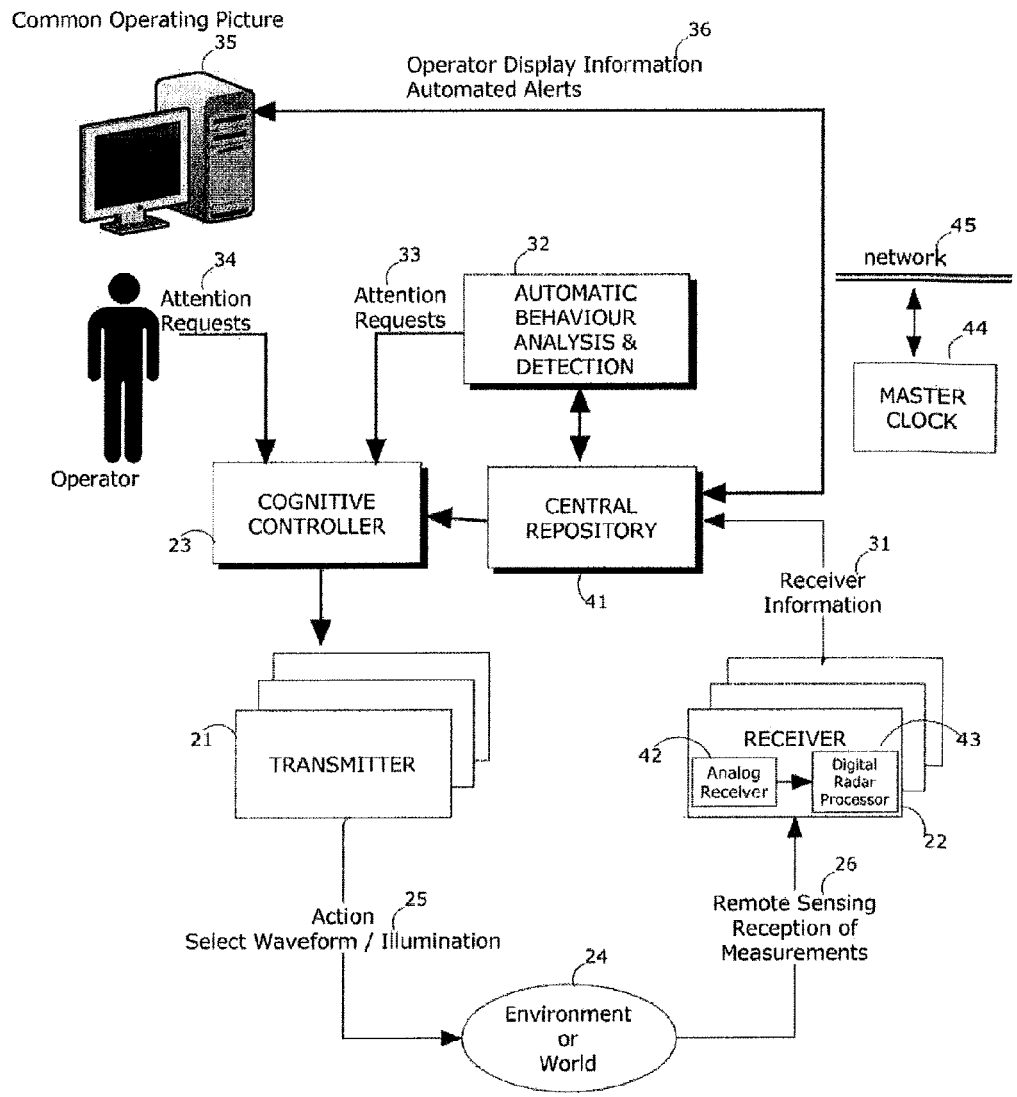
FIG. 4 is a block diagram of a practical implementation of a cognitive radar information network in accordance with the present invention.

The CRIN block diagram in FIG. 4 shows multiple Receivers 22 and Transmitters 21 memory organized in a Central Repository 41 which attempts to isolate the cognitive elements so they can be spiraled (i.e. upgraded by adding mostly new isolated components) into existing radar networks that do not presently have cognition. This is essential to manage cost and risk. Furthermore, cognition can be introduced incrementally, in one or more nodes at a time, with increasing levels of cognition added as software upgrades once the underlying R&D and implementations mature. Receiver information 31 from the collection of radars is organized in the Central Repository 41 providing direct access (or feedback) to the Transmitters 21 via the Cognitive Controller 23. Receiver information 31 in FIG. 4 includes target state, entropic state and also can include numerous other information such as target detections, other target tracking data, transmitter mode and receiver mode data, etc., so that Central Repository 41 has all of the information it needs (real-time, and historical) to perform its functions as described herein. Receiver information 31 such as target state, entropic state, and target trajectories for each radar node, i.e., for each combination of Receiver 22 and Transmitter 21, are computed by a respective Digital Radar Processor 43, which digitizes and processes measurements 26 received by an Analog Receiver 42 in Receiver 22.

While shown centralized, it should be understood that the Cognitive Controller 23 can provide local cognitive control to individual Transmitters 21 in the network based on respective Receiver feedback 27 (FIG. 2) (which in FIG. 4 is stored in Central Repository 41), or alternatively, cognitive control could make use of feedback from multiple Receivers 22 or globally from the entire network. Computer network interfaces 45 are assumed to exist between all system components allowing information to be easily shared.

Operator-initiated Attention Requests 34 come directly from the Operator. Other Attention Requests 33 are generated automatically through the Automatic Behavior Analysis and Detection (ABAD) processor 32, illustrated in FIG. 3 and FIG. 4. It should be noted that the ABAD processor 32 can generate on the fly post-processed Receiver information that can help characterize the environment for future rapid use by the Cognitive Controller 23.

System operators and users interact with a computer/display device 35 which presents various software tools to the user including a common operating picture that provides the required situational awareness derived from the CRIN. Computer/display 35 receives its operator display information 36 which can include automated alerts generated by the CRIN from Central Repository 41. Operator interactions with the CRIN are preferably logged in the Central Repository 41 for use by other system elements. For example, an operator may define the attention cells 13 using computer/display 35, which attention-cell definitions may then be stored in Central Repository 41.

The Cognitive Controller 23 determines the Actions 25 to be applied to each radar node. In response to a particular attention request, only a subset of radar nodes are typically affected. The Actions 25 consist of new transmitter modes and/or receiver modes selected by the Cognitive Controller 23 and used on the next cognitive cycle by respective Transmitters 21 and Receivers 22.

Transmitter modes are defined for each radar node. A transmitter mode is a particular set of transmitter illumination parameters which include waveform (e.g. SP, MP, LP), each of which affect range and resolution performance; RPM and elevation beam in some cases (e.g. surface beam and air beam with particular elevation angle with an agile radar).

The Cognitive Controller 23 controls each Receiver 22 by changing the Receiver (processing) mode in combination with the selected and associated Transmitter mode. Receiver mode parameters include threshold for sensitivity (PD, PFA), parameters affecting clutter mitigation, masking for areas of processing interest, tracking filters for air versus surface targets, etc.

The Cognitive Controller 23 also balances system constraints in its decisions, such as target data rate limits due to bandwidth constraints, and computational loading.

Figure 11:
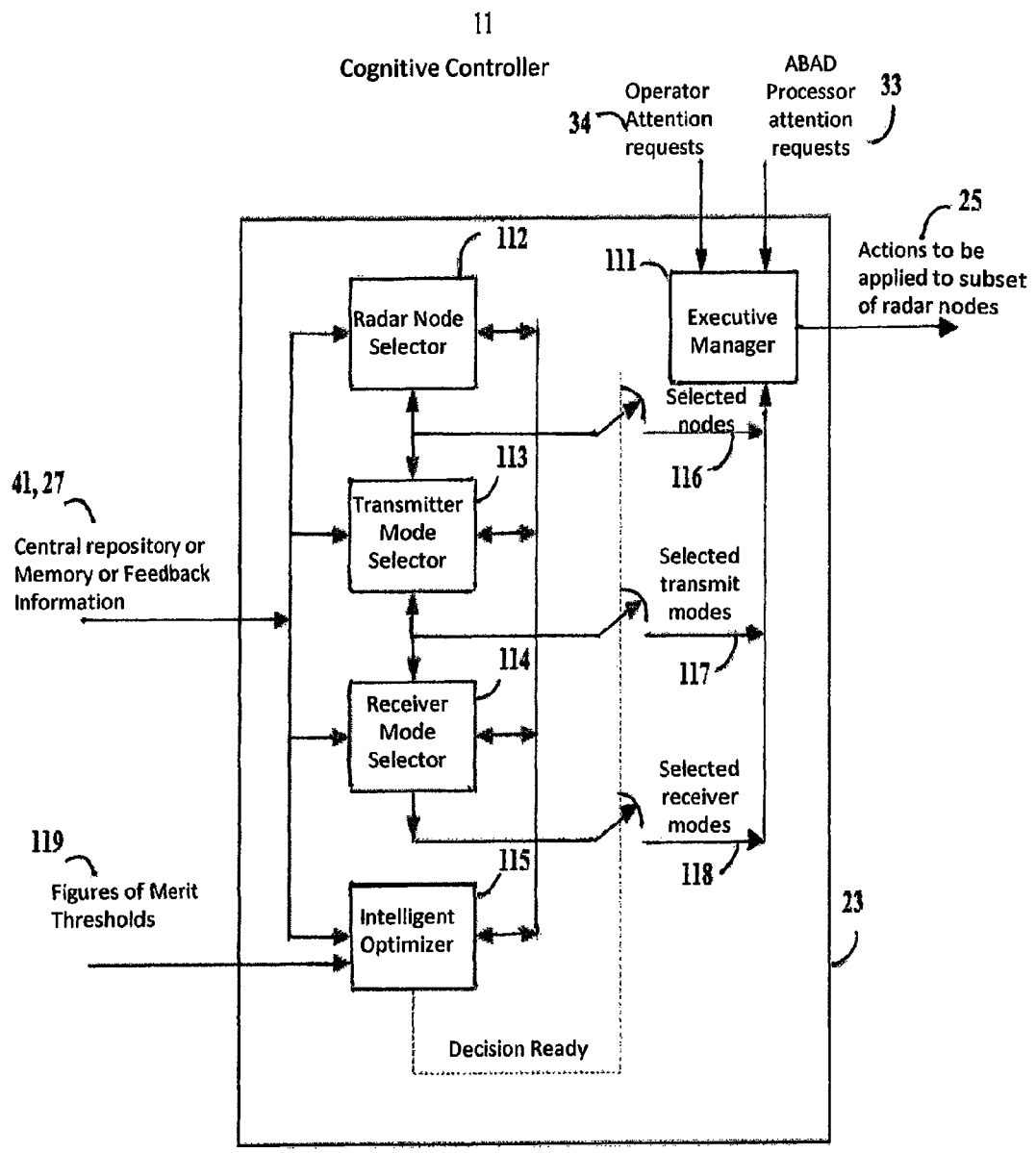
FIG. 11 is a block diagram of the cognitive controller for a CRIN in accordance with the present invention.

FIG. 11 provides a block diagram of a preferred embodiment of the Cognitive Controller 23 in accordance with the present invention. Cognitive Controller 23 includes an Executive Manager 111 which receives Operator Attention Requests 34 and ABAD Processor Attention Requests 33 and oversees the decision optimization process that results in the Actions 25 to be applied to a subset of the radar nodes. Actions 25 include an identification of selected nodes 116, along with selected transmitter modes 117 and selected receiver modes 118. Cognitive Controller 23 accesses Central Repository 41 (or feedback information 27 if a Central Repository is not available) to obtain records of past decisions OF Controller 23 and consequences of those decisions, along with information the CRIN has learned about its environment, including information captured in adaptive target maps 135 (FIG. 13) in accordance with the present invention.

As shown in FIG. 11, Cognitive Controller 23 further includes an Intelligent Optimizer 115. An optimum decision algorithm is carried out, preferably in an iterative fashion, by Intelligent Optimizer 115, which uses Figure of Merit Thresholds 119 to make robust radar performance decisions. A Radar Node Selector 112 determines which radar nodes are likely to change operating parameters for given attention requests 33, 34. A Transmitter Mode Selector 113 selects candidate transmitter modes for the respective radar nodes and a Receiver Mode Selector 114 selects correspondingly matched receiver modes. Intelligent Optimizer 115 calculates and seeks to minimize a cost function or alternatively maximize a reward function while satisfying the Figure of Merit Thresholds 119, which represent performance constraints on the optimization process. Intelligent Optimizer 115 may iterate by directing any of Radar Node Selector 112, Transmitter Mode Selector 113 and Receiver Mode Selector 114 to update their selections. Intelligent Optimizer 115 signals to Executive Manager 111 when a decision has been made and outputs to Executive Manager 111 the node selection 116, selected transmitter modes 117 and selected receiver modes 118 along with any cost function data and performance thresholds indicative of the quality of the decision. Executive Manager 116 will store these outputs in Central Repository 41 for use in subsequent decision-making.

Figure 12:
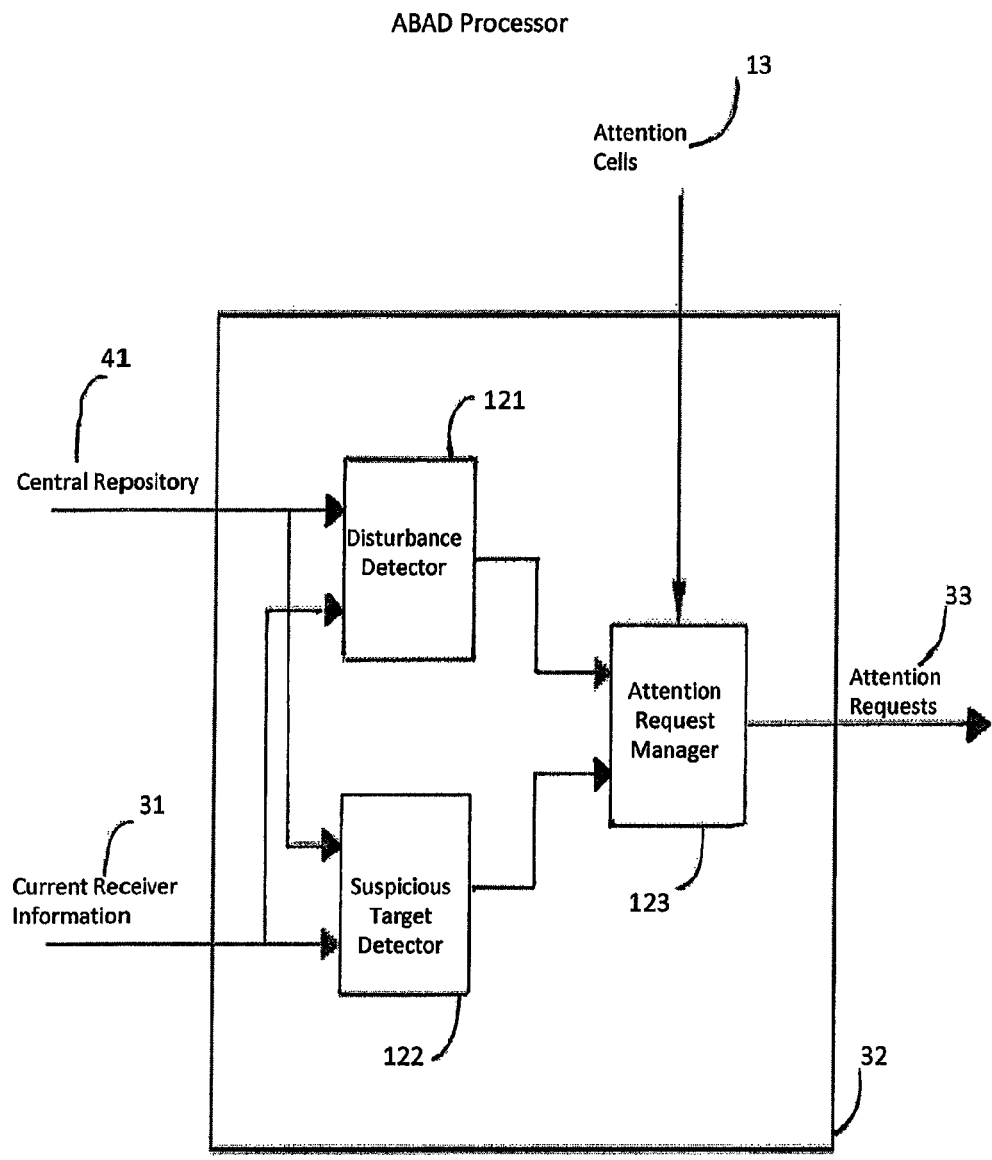
FIG. 12 is a block diagram of the Automatic Behavior Analysis and Detection Processor.

FIG. 12 showing a preferred embodiment of ABAD Processor 32, which generates Attention Requests 33. The defined attention cells 13, historical data from Central Repository 41 and the current Receiver Information 31 (real-time data) are inputs to ABAD Processor 32. (Note: if real-time target data is available in Central Repository 41, then Receiver Information 31 is not required separately as input.) ABAD Processor 32 includes an Attention Request Manager 123 that oversees the operation of ABAD Processor 32. Using the specification of attention cells 13, Attention Request Manager 123 determines which cells 13 are associated with suspicious target behavior as determined by a Suspicious Target Detector 122 or an environmental disturbance as determined by a Disturbance Detector 121. Attention Requests 33 are issued accordingly.

In accordance with a novel feature of the present invention, we introduce a new environmental information quantity referred to as adaptive target maps 135. Adaptive target maps 135 can be generated based on targets of opportunity observed over short-term and seasonal time frames in each attention cell, and versus each radar node's available Transmitter modes and Receiver modes. In this way, the CRIN can learn from targets of opportunity (i.e. the environment) target behavior, as well as the CRIN's own performance in terms of localized, cellular (i.e. radar nodal) coverage maps for each target type. Adaptive target maps can be further organized by their attributes (e.g. small or large RCS, slow or fast speed, acceleration, etc.) into subgroups for efficient cognitive processing. These post-processed data characterize the knowledge learned from the environment over time; and they can be organized in the Central Repository 41 (or another memory store or database) for permanent storage and exploitation by the system and the operator.

These new adaptive target maps 135 (analogous in a loose sense to adaptive clutter maps), provide meaningful surveillance performance information as a function of all Transmitter/Receiver modes and all attention cells for all radars in the network, allowing the Cognitive Controller 23 to manage system robustness when selecting new Transmitter modes for illumination and associated Receiver modes in response to attention requests.

Figure 13:
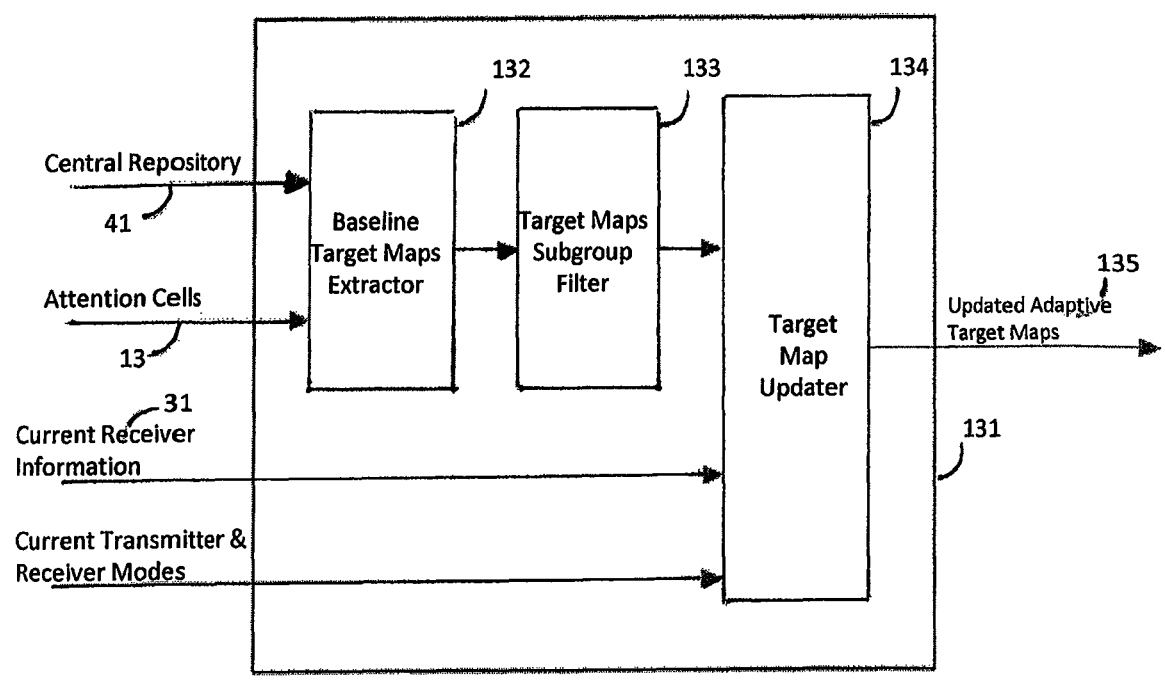
FIG. 13 is a block diagram of an adaptive target mapping processor which computes adaptive target maps in accordance with the present invention.

FIG. 13 illustrates a preferred embodiment of an Adaptive Target Mapping Processor 131 in accordance with the present invention which updates adaptive target maps 135 on-the-fly while the CRIN operates, storing updated target maps 135 in Central Repository 41. Adaptive Target Mapping Processor 131 is a three-stage processor consisting of a Baseline Target Maps Extractor 132, a Target Maps Subgroup Filter 133 and a Target Map Updater 134. Baseline Target Maps Extractor 132 accesses target map data stored in Central Repository 41 and extracts and organizes that data into target maps associated with each attention cell 13. Target Maps Subgroup Filter 133 then filters the target maps into subgroups, based on parameters such as radar cross section (e.g. small vessels, large vessel) and speed (e.g. slow vessels and fast vessels and aircraft). Finally, Target Map Updater 134 uses current Receiver Information 31 (which can be accessed directly from the Central Repository 41 if available there) to extract recent targets of opportunity associated with current transmitter and receiver modes to update the adaptive target maps. Those skilled in the art will appreciate that the update rate(s) of adaptive target maps can be tailored to use requirements. For example, updates could occur as frequently as every scan of the contributing radar nodes. Alternatively, the adaptive target maps could be updated at slower rates: for example, every hour, every day, every week, or every season. The adaptive target maps could also be organized and updated on the basis of electromagnetic propagation conditions as variations in coverage can be impacted significantly.

CRIN Details and Supporting Theory

The visual brain is a powerful, parallelized information processing machine with a built-in ability to perform certain tasks such as focusing attention on subjects of interest and pattern recognition at speeds far beyond the capability of traditional radar systems in existence today. With wide area radar information networks in the process of being deployed, we need such capabilities more than ever to manage the operator overload problem. We turn to cognition as the answer to this challenge, and lay in this section the theoretical foundation for the novel cognitive radar information networks described earlier. Haykin's book, *Cognitive Dynamic Systems, Perception-Action Cycle, Radar And Radio*, Cambridge University Press, England, March 2012, provides the background upon which this theory is based.

Much has been written on human cognition in the neuroscience literature but, unfortunately, with no unique definition for cognition to be found. Joakuin Fuster proposed an "abstract model" for human cognition, made up of five functional building blocks, namely perception, memory, attention, intelligence, and language. Hereafter, we refer to this abstract model as Fuster's paradigm for cognition. From an engineering perspective, we apply to radar Fuster's paradigm as an "orderly conceived structure", with memory building on perception, memory-driven attention building on perception, and intelligence building on all three preceding functional blocks. In functional terms, we describe in the context of a single radar, without loss of generality, the four building blocks of specific interest to cognitive radar as follows. The present invention extends these to multiple targets and multiple radars as needed by the CRINs described here.

1. Perception-action cycle, the function of which is to improve information gained about the environment on a (cognition) cycle-by-cycle basis. For this cyclic operation to be realized, there has to be a feedback link connecting the receiver to the transmitter, thereby establishing a global feedback loop embracing both the transmitter and the receiver; and, above all, including the environment inside its feedback loop.
2. Multi-scale memory, which is distributed throughout the radar system; the function of memory is to learn from the environment, so as to continually improve the model of the environment perceived by the receiver and the decision-making capability of the transmitter through the control action taken on the receiver via the environment.
3. Attention, which is memory driven, and whose function is to consolidate the perceptual processing power of the receiver and decision-making power of the transmitter through the appropriate allocation of system resources. System resources, for our purposes, include the controllable illumination parameters of the transmitter, processing modes of the receiver, and the computational and bandwidth abilities of the CRIN system.
4. Intelligence, which is the most profound of all the principles of cognition. Its function is to provide the means for a decision-making strategy that is optimal in the face of environmental uncertainties. The cognitive power of intelligence exploits the use of local as well as global feedback loops distributed around the entire radar system.

Perception-Action Cycle

Figure 5:
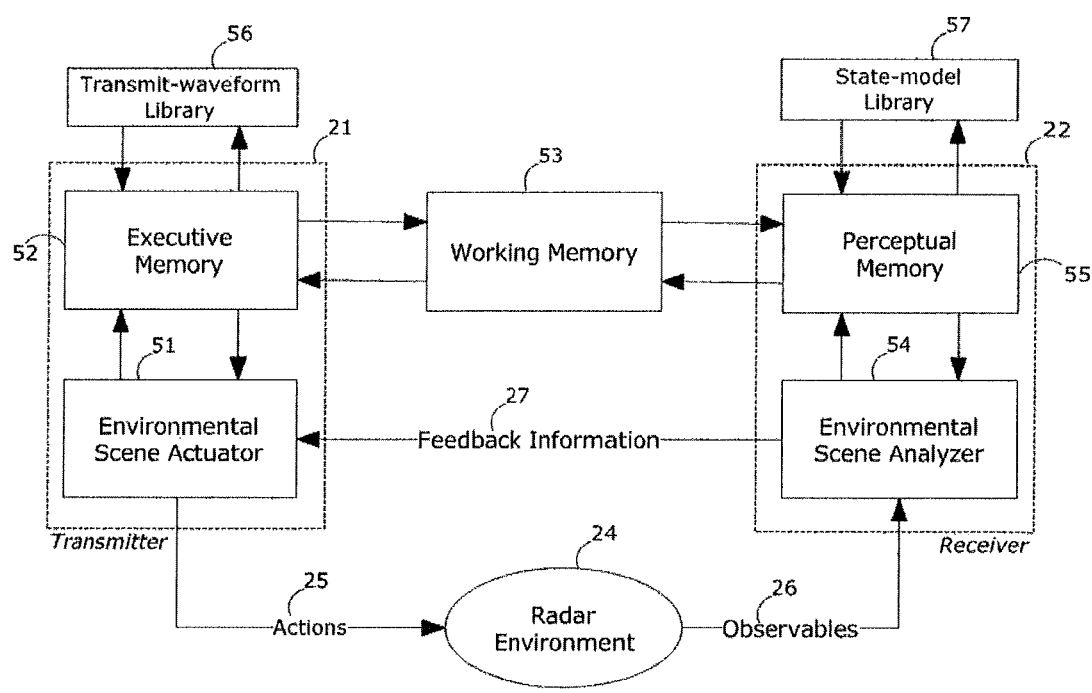
FIG. 5 is a block diagram of cognitive radar with multi-scale memory.

To elaborate on the first defining process of cognitive radar, namely the perception-action cycle, we may, without loss of generality, consider a simplified, single target tracking problem. In this context, the primary function of the environmental scene analyzer 54; constituting a functional block in the receiver shown in FIG. 5, is to provide an estimate of the state of the radar environment by processing the measurements or observables 26. The term radar environment 24 is used here to refer to the electromagnetic medium in which a target of interest is embedded. The observables 26 (i.e. measurements) refer to the complex baseband form of the radar returns produced by reflections from the target due to illumination 25 of the radar environment by a signal radiated from the transmitter 21. In effect, state estimation serves as "perception" of the environment in the perception-action cycle in FIG. 5.

Insofar as the cycle is concerned, another function of the receiver 22 is to compute feedback information 27 that provides a compressed measure of information contained in the measurements 26 about the unknown target.

Typically, the transmitter 21 and receiver 22 of the radar are collocated, in which case delivery of the feedback information 27 to the transmitter by the receiver is accomplished simply through a direct linkage, thereby simplifying the radar system design.

Turning next to the environmental scene actuator 51, constituting a functional block in the transmitter in FIG. 5, its primary function is to minimize a cost-to-go function based on feedback information 27 from the receiver 22, so as to act in the radar environment 24 optimally in some statistical sense. This optimization manifests itself in the selection of a transmitted signal whose waveform controls the measurements at the receiver input. The selection of a new transmitted signal or waveform is made on a cycle-by-cycle basis. In this sense, we may therefore look to the environmental scene actuator 51 as a local-level or node-specific cognitive controller 23.

With emphasis on the term "information" in what we have just discussed here, the perception-action cycle in FIG. 5 provides the basis for cyclic directed information flow across the entire radar system, inclusive of the environment 24; it is a cardinal characteristic of cognitive radar in accordance with the present invention.

In a preferred embodiment of the present invention, a master clock 44 (FIG. 4) is available to the entire CRIN via computer network 45. Network 45 is preferably a TCP/IP network. Each radar 12 is permitted to operate independently. The perception-action-cycle is carried out in a time ordered manner with respect to the master clock 44. Thereby, the network 45 operates in a synchronous-like manner. From a practical, implementation point of view, the network 45 allows for the arbitrary selection of the PAC time-step to suit the particular condition of the environment 24 and the capabilities of the independent radars 12. In so doing, flexibility is available to the CRIN.

Memory

Before proceeding to discuss the important role of memory in cognitive radar, it is instructive that we make a distinction between knowledge and memory:

Knowledge is a memory of certain facts and relationships that exist between them, none of which changes with time. In other words, knowledge is static in its contents.

Memory is dynamic in that its contents continually change over the course of time in accordance with changes in the environment. Stated in another way: the contents of memory are subject to time constraints, whereas knowledge is timeless and therefore, free of time constraints.

With a cognitive radar consisting of a receiver 22 and transmitter 21, conventionally, it is logical to split the memory into two parts, one residing in the receiver and the other residing in the transmitter. These two parts of memory are respectively called perceptual memory 55 and executive memory 52 as illustrated in FIG. 5. It is in the memory of cognitive radar where most of the learning from interactions with the environment is performed.

As the name implies, perceptual memory 55 is an integral part of how, in an overall sense, the receiver 22 perceives the environment 24. To be more specific, perceptual memory 55 provides the ability for the receiver 22 to interpret the incoming measurements 26 so as to recognize their distinctive features and categorize the features accordingly.

Perceptual memory 55 is the experiential knowledge that is gained by the receiver 22 through a process of learning from the environment 24, such that the contents of the memory 55 continually change with time in accordance with changes in the environment 24; the experiential knowledge so gained through learning becomes an inextricable part of the perceptual memory 55.

To satisfy the cognitive functional integration-across-time property, another cardinal characteristic of cognition, the perceptual memory 55 is preferably reciprocally coupled to the environmental scene analyzer 54. This reciprocal coupling implies the use of two links:

Feedforward (up) link from a compartment within the environmental scene analyzer 54 to the perceptual memory 55, which is intended to make it possible for the memory to update its contents in light of the new measurements.

Feedback (down) link from the perceptual memory 55 to the environmental scene analyzer 54, the purpose of which is to enable the analyzer 54 to retrieve information stored in memory 55; the retrieved information is naturally relevant to the particular categorical interpretation of the incoming measurements that is the focus of the attentional mechanism.

In effect, the perceptual memory 55 adds sophistication in the form of bottom-up and top-down learning to the perception-action cycle, making it that much more powerful in terms of learning about the environment 24.

Just as perceptual memory 55 relates to perception of the environment 24 in the receiver 22, executive memory 52 relates to the corresponding transmitter's action 25 in the environment 24. To be more precise, contents of the executive memory 52 are acquired through the transmitter's actions 25 in response to information about the environment 24 that is supplied to it by the receiver 22 via feedback 27; hence, the need for the feedback link included in FIG. 5; we may thus offer the following definition:

Executive memory 52 is the experiential knowledge gained by the transmitter 21 through the lessons learned from the actions 25 taken to control the receiver 22 via the environment 24, with contents of the memory 52 changing with time in accordance with how the receiver 22 perceives the environment 24.

Here again, the knowledge so gained through experience becomes an inextricable part of the executive memory 52. Executive memory 52 plays a key role of its own by learning how any new action 25 taken by the transmitter 21 in the environment 24 benefits from the experiential knowledge gained from previous actions.

Here again, in order to satisfy the cognitive functional integration across-time property, the executive memory 52 is preferably reciprocally coupled to the environmental scene actuator 51, as depicted in FIG. 5. The need for this second reciprocal coupling in a cognitive radar is justified as follows:
1. The feedforward (up) link from the environmental scene actuator 51 to the executive memory 52 enables the executive memory 52 to update its contents in light of new feedback information supplied to the actuator 51 by the environmental scene analyzer 54.
2. The feedback (down) link from the executive memory 52 to the environmental scene actuator 51 enables the actuator to retrieve information stored in the memory 52.

Thus far, we have justified the needs for perceptual memory in the receiver and executive memory in the transmitter. Naturally, we cannot expect these two memories to function independently from each other. To be more precise, these two memories have to be also reciprocally coupled, as indicated in FIG. 5. The transmitter and receiver of the cognitive radar are thereby enabled to operate in a synchronous manner through each cycle of the perception-action-cycle.

To be more precise, reciprocal coupling of the executive memory 52 to the perceptual memory 55 is required to address the issue of having to fully account for the cognitive functional integration across-time property. In so doing, the two memories are enabled to interact with each other so as to select the best action that can be taken by the transmitter 21 to control the environment 24 in light of the feedback information 27 passed onto it by the receiver 22. As depicted in FIG. 5, the cross-coupling between the perceptual memory 55 and executive memory 52 is made through the working memory 53, whose function is to coordinate sensory perception in the receiver 22 with the corresponding action 25 by the transmitter 21 in an orderly and timely manner. Specifically, if the wrong action is taken by the radar at one particular cycle, it is corrected on the next cycle.

Attention

In a fundamental sense, the purpose of attention is to selectively allocate the available system resources to realize the execution of a goal-directed action by the transmitter. We may therefore think of attention as a mechanism for prioritizing resource allocation in terms of practical importance, which makes a great deal of intuitive sense for the following reason. The system resources of cognitive radar are naturally limited, hence the following definition:

Attention is a mechanism that protects both the perceptual-processing power of the receiver and the decision-making power of the transmitter from the information-overload problem through prioritization of how these system resources are allocated.

In the context of cognitive radar, the term "information overload" refers to the difficulty experienced by the system when the receiver's task of sensing the environment and the transmitter's task of decision-making are compromised by having to handle too much information contained in the incoming measurements.

To elaborate, from the perspective of the receiver of cognitive radar, perceptive attention involves focusing the computational processing power of the receiver on a specific target situation that is of special interest. With perception consisting essentially of parallel processing and adaptive matching of characterizing "features" of the measurements to a particular "grid point" in the state-model library 57 in the right-hand side of FIG. 5, the desired mathematical model describing evolution of the hidden state across time is computed. In turn, that adaptive matching process leads to "top-down feedback", whereby the computed state-model is made available to the environmental scene analyzer 54, and with it, state estimation of the target is carried out. What we have just described here is a localized perception-action cycle going on in the receiver 22 with computation of the state-model as the object of interest.

Turning next to executive attention, the objective here is to focus the transmitter illumination capabilities in the transmitter 21 through the preferable use of an "explore-exploit strategy". The exploration phase of the strategy is based on two points:
1. The transmit-waveform parameter vector (that defines the transmitter mode) used in the preceding perception-action cycle is treated in the current cycle as the "centre point" of a cluster defined under point (2).
2. The grid points in the "transmit-waveform library" 56 the left-hand side of FIG. 5 that lie in the immediate neighbourhood of the centre point complete the rest of the cluster for the current cycle.

The complete cluster of grid points so obtained is downloaded to the environmental scene actuator 51 for action in the environment.

We may summarize the roles of attention in cognition as follows:
1. Based on the perceptual memory 55 and executive memory 52 built into cognitive radar, the attentional mechanism of the system allocates the available system resources, including prior knowledge; the two internal libraries 56 & 57 of cognitive radar constitute prior knowledge.
2. In addition to these two memories, the attentional mechanism looks to the working memory 53 for information on the consequences of actions taken by the system, with this provision being made on a short-time basis.

Intelligence

Intelligence is the ability of cognitive radar to continually adjust itself in a robust manner through an adaptive process by making the receiver 22 respond to new changes in the environment 24 so as to create new forms of action 25 and behavior in the transmitter 21.

Given the (i) localized cluster of transmit-waveforms selected from the internal library 56 of the transmitter by the executive attentional mechanism, and (ii) feedback information 27 about the environment supplied to the transmitter 21 by the receiver 22, the decision making mechanism in the environmental-scene actuator 51 is designed to pick the particular transmitter waveform within the cluster, for which a prescribed cost function is minimized. This optimization completes the exploit phase of the explore-exploit strategy. A unique feature of this decision-making process is the "smooth" manner in which selection of the transmit-waveform parameter is made from one perception-action cycle to the next; this feature is unique to a cognitive radar with multi-scale memory.

Intuitively, we may therefore say that at each perception-action cycle, the intelligent capability of the environmental scene actuator 51 in the transmitter 21 building on attention, memory and perception, picks the particular transmit-waveform that is adaptively matched to the environment 24 in an optional manner, and its optionality is maintained from one cycle to the next. Through feedback-based control in the transmitter 21, the cognitive radar becomes increasingly more intelligent whereby a prescribed cost-to-go function is progressively minimized on every perception-action cycle and with it, information about the environment is more efficiently utilized from one cycle to the next.

Looking at the perception-action cycle of FIG. 5, we now see that we have a highly complex closed-loop feedback control system, nested within numerous local feedback loops positioned alongside global feedback loops. Accordingly, the receiver and transmitter of cognitive radar process information about the environment in a self-organized, synchronized manner and on a time-ordered basis.

In summary, the cognitive role of the transmitter 21 is that of decision-making, in the context of which probabilistic inference, preferably, plays a key role. The term "inference" or "reasoning" refers to a process by means of which conclusions to a problem of interest are reached. Inference may well be the outstanding characteristic of intelligence. We may therefore sum up the role of intelligence in cognition as follows:

The decision-making mechanism in the transmitter of cognitive radar uses probabilistic inference to pick intelligent choices in the face of unavoidable uncertainties and disturbances in the environment. The uncertainties are attributed to certain physical characteristics of the environment that have been overlooked or they are difficult to account for in modeling the environment; as for disturbances, they arise due to stochastic phenomena beyond our control. Indeed, it may be justifiably argued that the task of decision-making in the face of environmental uncertainties and disturbances is the very essence of building a reliable radar system, which is where intelligence plays the key role.

Preferable Two-State Model of Cognitive Radar

Traditionally, in a state-estimation procedure for target-tracking applications, we start with a state-space model, the formulation of which is based on understanding the physical underpinnings of the radar environment. This model consists of a pair of equations:

i. System equation, which describes, in mathematical terms, evolution of the state across time with the additive system noise acting as the driving force. The state is defined as the minimal set of physical parameters that describe the target at a particular instant of time and particular location in space.

ii. Measurement equation, which mathematically describes the dependence of measurements on the hidden state as the receiver input, corrupted by additive measurement noise.

Thus, traditionally, we only think of the target state, to be estimated using the measurements. However, a cognitive radar is radically different from its traditional active radar counterpart in the following sense: The state-space model of the environment 24 lies inside a closed feedback loop 27, in which the receiver 22 is linked to the transmitter 21.

In other words, we have feedback information supplied to the transmitter by the receiver. The key question is, how do we describe this feedback information that could provide the basis for a secondary state that supplements the target state?

To address this question, we first recognize that the source of the secondary state resides in the "estimation error vector", defined as the difference between the so-called "actual" state of the target and its estimate. Recall that the "actual" state is extracted from the state-model library through an adaptive matching process governed by perceptive attention, which was discussed previously. Since the state-estimation error vector is random, we may quantify it by appealing to Shannon's information theory. Specifically, entropy provides the "metric" for measuring the information content of the state-estimation error vector. Now, we are ready to answer the question just raised by introducing the notion of entropic state, representing the secondary state that supplements the target state.

For us to fully describe the environment 24, we therefore preferably need to think of a two-state model, which embodies two entirely different notions:

1. Target state, which is of a deterministic physical kind. Ignoring the system noise, evolution of the target state over time is described by a deterministic continuous differential equation, which is often nonlinear.

2. Entropic state, which is of an information-theoretic kind.

As radically different as these two states are from each other, they do share a common feature. The target and entropic states of the environment change over time as the cognitive radar progresses from one perception-action-cycle to the next. To elaborate, the entropic state accounts for the following uncontrollable realities:

Uncertainties, which are attributed to the fact that the target state is unknown.

System noise, which is of stochastic nature, attributes to physical disturbances in the environment.

Measurement noise, the sources of which include thermal noise generated at the amplifier input in the receiver as well as quantization noise that arises from using an analog-to-digital converter for digital processing of the complex baseband measurements, representing the radar returns. Then there is lake/sea clutter, weather clutter and other interference that would also have to be accounted for.

Recognizing that a cardinal characteristic of cognitive radar is the "control" exercised indirectly by the transmitter 21 over the measurement noise in the receiver 22, the entropic state provides the preferable mathematical premise for facilitating the feedback link from the receiver to the transmitter. In so doing, the entropic state—representing preferably in accordance with the present invention the feedback information 27 in FIG. 5—is responsible for improving the information—processing power of cognitive radar, which is unreachable by a traditional active radar.

The adoption of entropic state as the feedback information 27 from the receiver 22 to the transmitter 21 in a preferred embodiment of the present invention has a profound impact on how the transmitter is designed. Specifically, it opens the door for using "reinforcement learning" as the approximate dynamic programming algorithm for designing the cognitive controller, whereby computational complexity of the transmitter is reduced dramatically.

To summarize, modeling of the environment in cognitive radar comprises two states, one deterministic and the other stochastic, that are respectively defined as follows:
1. Target state, which is the minimal set of deterministic parameters needed for describing the target hidden from the receiver, and therefore unknown, at any instant of time and physical location in space.
2. Entropic state, which is an information theoretic measure of the environmental uncertainties and disturbances that are responsible for the errors made by the receiver in estimating the target state.

From these two definitions, it follows that the closer we bring the entropic state of the environment to zero, the more deterministic the cognitive radar becomes. Stated in another way, the entropic state represents the "risk" that arises from uncertainties and disturbances and the smaller it becomes through cognition, the more "reliable" the cognitive radar becomes, hence the reference to cognitive radar as a risk controller.

Application to Real-World CRINs

With the material on cognitive radar theory at hand, the stage is now set for us to extend that theory addressing the real world of the cognitive radar information network (CRIN) in accordance with the present invention, aimed at security applications around large bodies of water such as the Great Lakes.

Figure 6:
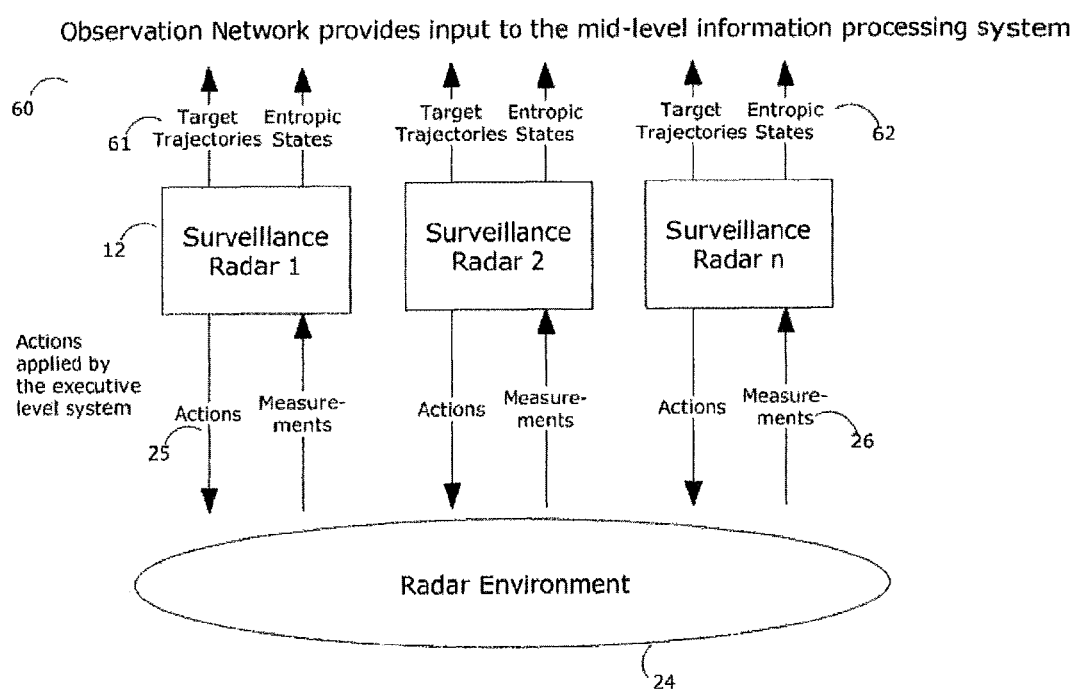
FIG. 6 is a block diagram of the Observation Network in the CRIN in accordance with the present invention.

In structural terms, the CRIN is composed of three systems integrated into one that is appropriately referred to as complex system of systems; specifically, we have:

Observation network 60, which consists of a network of inexpensive marine surveillance radars 12, each is cognitized, building on the current design through software expansion. FIG. 6 shows a block diagram at the observation network 60. The observation network 60 supplies target trajectories 61 and entropic states 62 to the mid-level information processing system 80 derived from measurements 26 received in response to illuminations 25.

Mid-level information-processing system 80 (FIGS. 8 and 10), which processes the outputs of the individual surveillance radars 12 with the aim of solving the suspicious target-recognition problem and provides the Executive-level system 90 (FIG. 9) with detected suspicious targets and environmental disturbances of interest. Mid-level information-processing system 80 includes a Ssoft computing algorithm processor 71 (FIGS. 7 and 8) for detecting suspicious targets which provides decisions 72 on the detection of suspicious target behaviors based on user-defined behavioral thresholds 73.

Executive-level system 90 (see FIG. 9), which is where overall control and decision-making in the entire CRIN is centered. The primary aim here is for Cognitive Controller 23 to command subsets of surveillance radars 12 in the observation network 60 to focus attention on one or more areas in the environment 24. Such areas require enhanced performance as a result of (i) the detection of suspicious targets, (ii) the presence of environmental disturbances, or, (iii) operational priorities as determined by the operator 91.

With the observation network explained previously, we may now proceed to describe the mid-level information processing network, which involves two issues: the detection of suspicious targets and generalization of the entropic state.

Suspicious Target Detection

Perhaps, the most challenging problem in designing the CRIN for security is, that of detecting the presence of one or more suspicious targets. As previously mentioned, this problem may be viewed as those of finding a "needle in the haystack". Not only that, but also the solution to the problem has to be provided automatically in an on-line manner.

To appreciate the practical difficulty of the suspicious-target detection problem, consider a highly congested target traffic situation on Lake Ontario. Currently, standardized, robust methods for detecting a suspicious target buried in such an environment using signal/information-processing techniques automatically in an on-line manner are not known.

This statement may not be surprising for the simple fact that detection of a suspicious target in the scenario addressed herein is entirely different from the traditional target-detection problem in the presence of sea/lake clutter, where we may use a Bayesion hypothesis testing procedure. Sure, in the case of suspicious target detection, we can also postulate a hypothesis. But the nature of the new hypotheses, in accordance with the present invention, are preferably behavioral, not mathematical.

To emphasize the nature of the behavioral hypotheses in the suspicious-target detection problem, we need to remind ourselves of the underlying characteristics of a suspicious-target, namely:
A border crossing
A rendezvous
Loitering in an exclusion zone (e.g. an area around a nuclear power station)
Other abnormal target behavior (e.g. a trajectory that deviates from a regulated laneway or seaway, turning ones AIS transponder off, a trajectory in an unusual place or at an unusual time, etc.)

Figure 7:
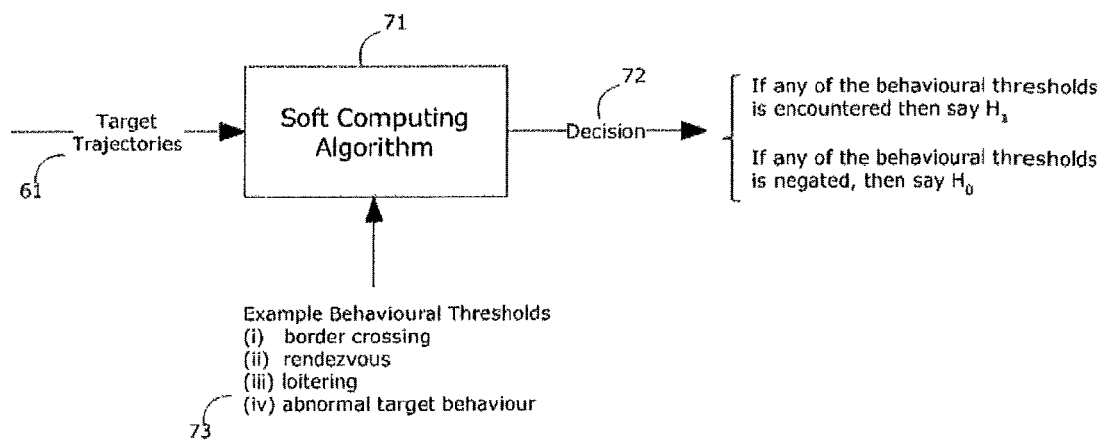
FIG. 7 is an illustration of the soft computing algorithm for detecting suspicious targets in accordance with the present invention.

Each of these discriminants is of a "behavioral" kind as shown in FIG. 7. We can now define two hypotheses of interest:
Hypothesis, H0: The radar trajectory under test belongs to a well-behaved target because its behavior is normal.
Hypothesis, H1: The radar trajectory under test belongs to a suspicious target because it its behavior is abnormal.

Having clarified the underlying issue involved in the detection of a suspicious target, the algorithmic mechanism to solve this new kind of target detection lies in the use of soft computing algorithm 71 as illustrated in FIG. 7. We may therefore go on to say that the issue of detecting a suspicious target in a complex and dense target environment can best be tackled through the use of fuzzy logic, neural networks, and soft computing. We need to remind ourselves of the fact that the exploitation of tolerance for imprecision and uncertainty underlies the remarkable human ability of a radar operator. Indeed, it can be justifiably argued if it were possible for an experienced radar operator to focus attention entirely on the radar screen picturing congested ensemble of target tracks, then at a certain point in time—that operator will have detected the suspicious target.

FIG. 7 presents a block-diagrammatic depiction of a soft computing algorithm processor 71 for the detection of a suspicious target based on input target trajectories 61. Note that unlike traditional target detection, the threshold in soft computing takes the form of a behavioral threshold 73.

Note also that in FIG. 7, we have used the "if-then" rule in the way in which the decision 72 is made in favor of hypothesis H0 or hypothesis H1. For example if the trajectory of a target deviates from a regulated laneway, then that target is suspicious. This example illustrates the logic behind probabilistic reasoning.

The principal constituents or candidates for the soft computing algorithm processor 71 are three-fold:
1. Fuzzy logic, which is primarily concerned with imprecision.
2. Neural networks, the role of which in soft computing is learning theory.
3. Probabilistic reasoning, which is primarily concerned with the issue of uncertainty.

The important note here is that although there exists overlaps between these three constituents, when it comes to soft computing they do indeed complement each other.

Entropic State of Localized Environment

Another topic that needs to be addressed in the design of CRIN is that of environmental disturbances such as precipitation or sea/lake clutter, for which we need a reliable indicator. The entropic state of an environment was introduced earlier in the context of a single cognitive radar that tracks a single target; this scenario is somewhat idealized but, nevertheless, we have generalized it in a practical way, as follows.

In a real-world surveillance scenario intended to track multiple targets using a single radar, we have to think in terms of the entropic state 62 of a "localized" part of the environment under surveillance, where the radar is one of the many within a CRIN. The key question is how do we define and therefore compute the entropic state 62 of such a localized environment?

To address this fundamental question of practical importance, we make the following two observations:
1. Using the target tracking algorithm of the surveillance radar 12, we have access to the state-estimation error vector or covariance matrix of each target under surveillance; accordingly, we may compute the entropic state of each of the target, being tracked.
2. The target states are all independent of each other. From information theory, we know that given a set of statistically independent random vectors, the overall entropy of the set is equal to the sum of the entropies of the individual random vectors.

It follows therefore that in radar surveillance, the composite entropic state 62 of the associated localized environment is equal to the sum of all the entropic states concerned.

Now, for most of the time, radar surveillance of the environment is in a steady state, which means that in a corresponding way the composite entropic state 62 is relatively constant. It follows therefore that any noticeable increase in this relatively constant value is attributed to the unexpected occurrence of some disturbance in the localized environment. More than likely, a natural cause for such a disturbance is weather precipitation or increased surface clutter.

The composite entropic state 62 of a localized environment under surveillance provides a "barometer" for disturbances due to weather precipitation and/or clutter in the environment.

The Mid-Level Information Processing System

Figure 8:
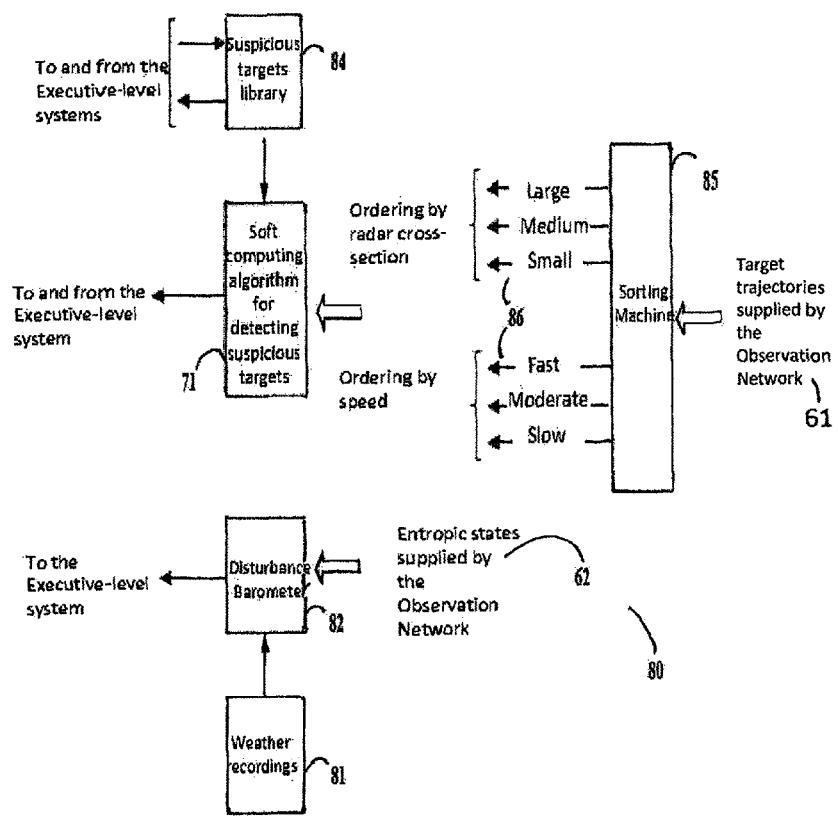
FIG. 8 is a block diagram of the mid-level information processing system in the CRIN in accordance with the present invention.

In FIG. 8, we have assembled the functional blocks that constitute the mid-level information-processing system 80 of the CRIN, the inputs of which consist of target trajectories 61 and entropic states 62 computed by the individual surveillance radars 12 in the observation network 60. The new functional block included in FIG. 8, namely the sorting machine 85, is intended to provide a systematic mechanism for implementing the engineering paradigm: divide and conquer, which was mentioned previously. Simply put the sorting machine 85 orders the incoming inputs from the observations network 60 into sub-groups 86; for example, we may sort by radar-cross sections of the targets (e.g. small, medium, and large), as well as by target speeds (e.g. slow, moderate and fast).

In so doing, the tasks to be performed by the soft computing algorithm 71 for the detection of suspicious targets (using target trajectories) and the issue of precipitation alarms (using entropic states) are simplified considerably.

Figure 10:
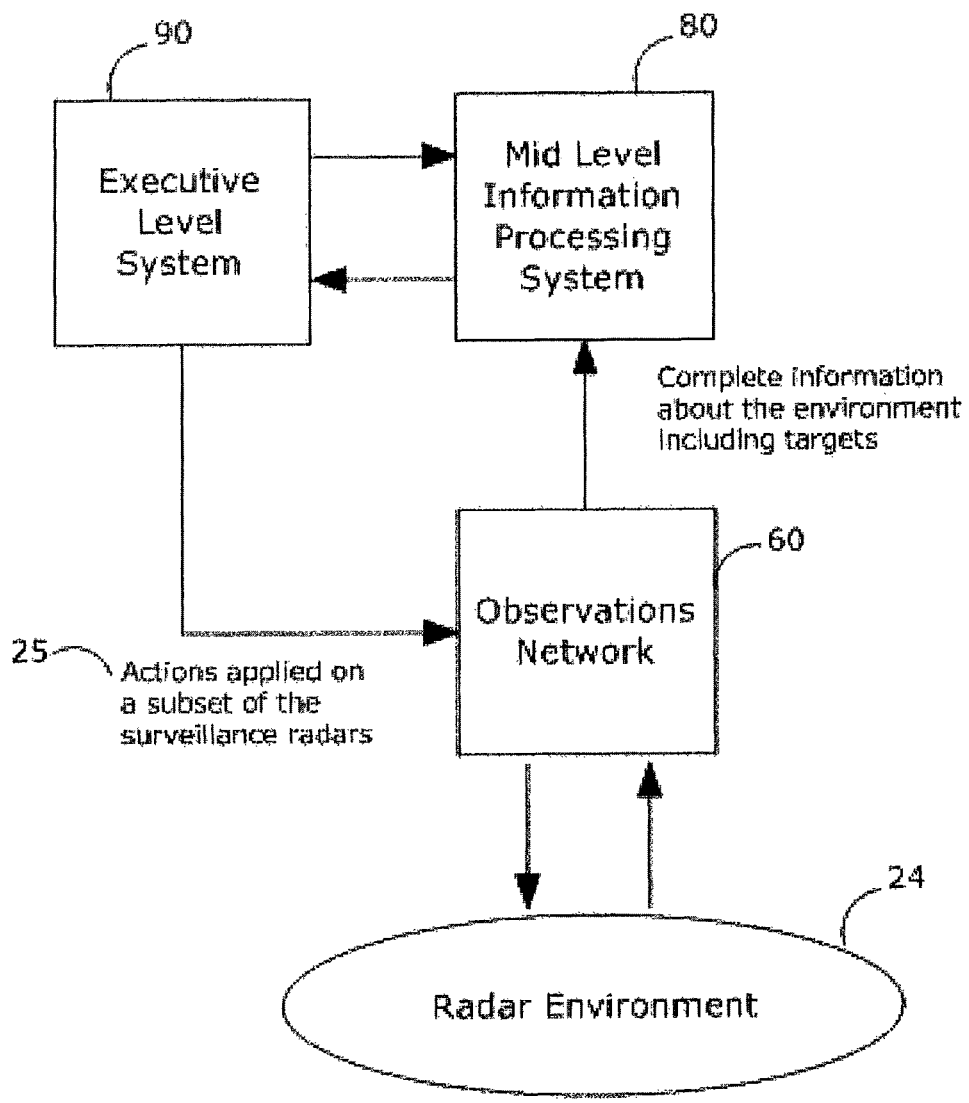
FIG. 10 is a block diagram of the CRIN showing the observation network, mid-level information processing system and executive-level system in accordance with the present invention.

Note that the upper part of FIG. 8 includes a suspicious target library 84 (indicative of suspicious target behaviors) that is used by the soft computing algorithm 71 and is reciprocally coupled to the executive memory 52 in the executive-level system 90 (see FIG. 10). This library consists of prior information (e.g. provided by the operator) as well as information learned from experience by the cognitive controller 23 over the course of time.

The Executive-Level System

Figure 9:
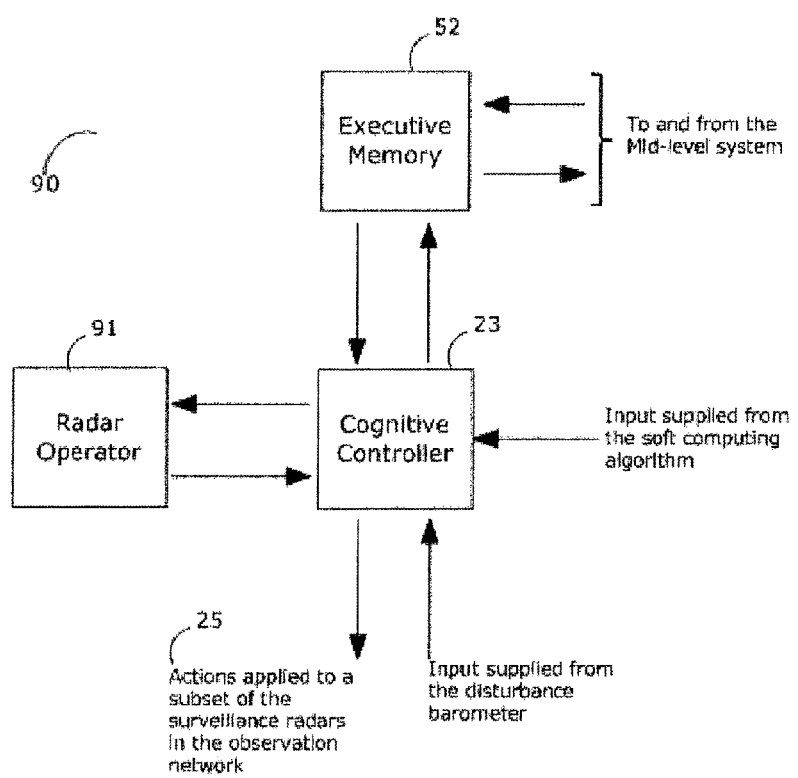
FIG. 9 is a block diagram of the executive-level system in the CRIN in accordance with the present invention.

The observations network 60 and mid-level information-processing system 80, described in FIGS. 6 and 8, respectively, provide the front ends of the third and last functional block in the CRIN, namely the executive-level system 90, depicted in FIG. 9. The system consists of three constituents:
 Radar operator 91,
 Cognitive controller 23, and
 Memory 52 reciprocally coupled to the cognitive controller 23

In a way, the cognitive controller 23 builds on the following cognitive processes:
 The perception-action cycles performed individually by the surveillance radars 12 through their interactions with the radar environment 24;
 Memories built into the surveillance radars 12; and
 The computations performed to produce target trajectories and entropic states pertaining to the radar environment 24.

Moreover, the cognitive controller 23 looks to the mid-level information processing system 80 for the soft-computing detection of suspicious target(s), and environmental disturbances such as precipitation and surface clutter, if and when they arise. Last but by no means least; the cognitive controller 23 is reciprocally coupled to the radar operator 91, who is responsible for the final decisions made. The radar operator 91 can call for attention to a particular area and task the cognitive controller 23 to deliver it.

The cognitive controller 23 can also be authorized to apply attention in an intelligent manner in response to environmental disturbances or a discovered suspicious target, for example, in order to keep the CRIN performance optimized automatically. It is therefore not surprising that the cognitive controller 23 is by far the most powerful artificial functional block in the CRIN. Its primary function is two-fold:
1. Decision-making, which involves identification of the localized part of the radar environment 24 requiring attention as well as the associated surveillance radars in the CRIN that can impact performance there (for example, the radars that are closest), and 2. The speedy focused attention on the areas of interest, directing respective surveillance radars 12 to apply their system resources to enhance performance in those areas, in an intelligent manner subject to system constraints.

FIG. 9 shows a block diagram of the executive-level system 90, where the executive memory's 52 function is to store information relating to decisions made by the cognitive controller 23 and continually update the stored information from one perception-action cycle to the next. In other words, the executive memory 52 continually learns from overall interactions with the environment 24 and every time the controller 23 is about to act, the executive memory 52 reminds it of past actions taken and their consequences.

One other important note is the fact that the executive memory 52 is also reciprocally coupled to the suspicious targets library 84 in the mid-level information processing system 80 to learn from prior knowledge stored therein and provide it with new information gathered from the controller's overall interactions with the environment 24.

Lastly, the cognitive controller 24 looks to the disturbance barometer 82 for information on precipitation and clutter, the occurrence of which may well be needed for decision-making.

Focusing Attention on the Area of Interest

How does the Cognitive Controller 23 command the attention of the CRIN to an area of interest? The explore-exploit strategy is one preferred approach in accordance with the present invention.

This strategy works as follows:
1. Knowledge (obtained through memory) of the available transmitter illuminations and receiver processing modes associated with each radar that has influence over the area of interest is provided.
2. A cluster of adjustable radar parameter combinations is formed for this subset of radars, with the current radar parameter vector representing the centre of the new cluster. This move constitutes the first step in the exploration phase and the starting point of a perception-action-cycle.
3. For each radar in the subset, the entropic state of the targets in question is made available to the Cognitive Controller 23. Alongside this entropic state, an entropic reward function is computed, which relates to the improvement in measured performance from the previous PAC step. The algebraic sign of this entropic reward function guides the action of the Cognitive Controller 23 in a correct manner. The sign is positive if the reward is positive; otherwise, it is negative in which case we have the equivalent of "punishment." In a loose sense, we may think of reinforcement learning as a "reward and punish" sort of algorithm.
4. The Cognitive Controller 23 smoothly advances from the current radar parameter-vector to a new one in the cluster of possible parameter-vectors using, for example, a reinforcement learning algorithm. Each action (i.e. change) taken by the cognitive controller 23 will result in a corresponding change in the entropic state.
5. The Q-learning algorithm is one method of reinforcement learning and planning, whereby both learning and planning are integrated together. Using the algorithm, the optimal action is computed and taken by selecting that particular radar parameter vector for which the performance of each radar in the subset is optimized, and with it the exploit phase of the strategy is completed.

For our problem, the Q-factor is defined on the basis of (entropic) state-action pairs. The behavioral task of reinforcement learning positioned in the Cognitive Controller 23 is to find an optimal policy after trying out various possible sequences of actions, observing the transition from one entropic state to another for each radar under test, and finally, the corresponding rewards resulting from the transitions. The policy used to generate such a behavior is called the "behavior policy." To describe the essence of the Q-learning algorithm, consider a sample consisting of a trial action, performed on an entropic state that results in transition to a new state and therefore an observed reward resulting from the transition. The Q-leaning algorithm provides an online procedure for learning an optimal behavior policy through experiential interactions of the Cognitive Controller 23 with the radar environment 24, which is gained solely on the basis of the four-tuple sample: current entropic state, trial action, next entropic state, and transition reward. In short, the Q-learning algorithm may be viewed as a combination of value iteration algorithm and Monte Carlo simulation, and is used in a preferred embodiment of the present invention.

In reinforcement learning, the value function is defined as the expected value of an "infinite" sum of discounted rewards for a particular entropic state; in practice, the summation is terminated, once the value function stabilizes. As such, the value iteration is an algorithm based on iterative computation of the value iteration function.

The Integrated Cognitive Radar Information Network

In FIG. 10, we have integrated the three parts of the CRIN, namely the observations network 60, mid-level information-processing system 80 and the executive-level system 90, into a single block diagram, representing a preferred embodiment of the present invention.

Examination of FIG. 10 reveals that we now have a new global perception-action cycle that embodies all three constituents' parts of the CRIN as well as the environment. In effect, in building the CRIN, we have made the entire network into a closed-loop feedback control system that is reciprocally coupled to the radar environment.

To summarize, we may describe the CRIN as a distributed complex system of systems that operates in a self-organized and synchronous manner, with all the practical benefits attributed to cognition. Most importantly, referring to FIG. 10, we see that the CRIN embodies several perception-action-cycles that include the environment. Hence, an enhanced radar information processing network is realized.

Particular features of our invention have been described herein. However, simple variations and extensions known to those skilled in the art are certainly within the scope and spirit of the present invention.

What is claimed is:

1. A cognitive radar information network surveillance system monitoring a multi-target environment, said system comprising at least one said radar sensing node, a repository, and a cognitive radar controller, said radar sensing node comprising:

a radar transmitter for illuminating a respective surveillance volume of said environment with a radio frequency waveform emitted through a transmitting antenna operatively connected to said transmitter; and a receiver operatively connected to a receiving antenna for receiving echoes from multiple targets and clutter in said environment in response to said emitted waveform, said receiver comprising a digital radar processor for generating receiver information about said environment;

said repository being operatively connected to said receiver for receiving and storing said receiver information, the stored receiver information being accessible by said cognitive controller as historical receiver information;

to automatically focus system attention on a region contained within a combined surveillance volume in response to an attention request for improved surveillance performance in said region, said cognitive controller being configured to execute at least one action taken from the group consisting of operating or energizing said transmitter in accordance with a set of selected illumination or transmit-waveform parameters, operating said receiver under a selected processing mode, and controlling said transmitting antenna; wherein said cognitive controller is further configured to make selections of radar control parameters including illumination or transmit-waveform parameters, receiver processing modes, and antenna control parameters in accordance with consequences of past decisions as to radar control parameters, stored as additional said historical receiver information in said repository, said consequences comprising effects on surveillance performance figures of merit in said region.

2. The system defined in claim 1 wherein said repository is configured to provide some of said receiver information to an operator in real-time.

3. The system defined in claim 1 wherein said region is one or more cells selected from an arrangement of predefined attention cells, said predefined attention cells covering said combined surveillance volume.

4. The system defined in claim 1 wherein said region is defined in relation to a target of interest.

5. The system defined in claim 4 wherein said target of interest is dynamic and said region moves with said target of interest.

6. The system defined in claim 1 wherein said region is defined in relation to an environmental disturbance such as weather.

7. The system defined in claim 1 wherein said region is defined in relation to geometries of interest taken from the set including borders and exclusion zones.

8. The system defined in claim 1, further comprising an automatic behavior and analysis detection processor operatively connected to said cognitive controller, said attention request being initiated by an event taken from the group consisting of an operator request or an automatic request from said automatic behavior and analysis detection processor in response to the detection of suspicious target behavior.

9. The system defined in claim 8 wherein said automatic behavior and analysis detection processor includes generic digital processing circuits modified by software computing algorithms taken from the group consisting of fuzzy logic, neural networks and probabilistic reasoning to detect suspicious target behavior.

10. The system defined in claim 1 wherein said improved surveillance performance figures of merit includes increased target detection sensitivity over said region.

11. The system defined in claim 10 wherein said cognitive controller, said transmitter, said receiver and said transmitting antenna are configured to maintain overall surveillance performance across said combined surveillance volume within acceptable limits while said cognitive controller operates to improve performance in said region.

12. The system defined in claim 1 wherein said use of historical receiver information includes the use of adaptive target maps based on targets of opportunity observed by said system in said environment.

13. The system defined in claim 1 wherein said cognitive controller is configured to execute a perception-action cycle at a clock rate determined by a master clock of said cognitive radar information network, said master clock being operatively connected to said receiver and said repository for aligning in time said receiver information with receiver information from other radar sensing nodes in said network, further comprising a feedback path between said receiver and said cognitive controller effected by an operative connection between said cognitive controller and said repository, thereby enabling an execution of said perception-action cycle.

14. The system defined in claim 13 wherein said feedback path is based on the entropic state derived from the multiple tracked targets tracked by said system.

15. The system in claim 1 wherein said at least one radar sensing node is one of a plurality of radar sensing nodes each taken from the group consisting of fixed, surface-mounted marine radars, agile radars, ship-based radars, mobile radars, aerostat radars, air traffic control radars, and military radars.

16. A method for intelligently focusing the attention of a radar surveillance system on a region of interest contained in a surveillance volume, comprising: operating a cognitive radar controller to receive and process an attention request, the processing of said attention request including selecting at least one set of radar operating parameters taken from the group consisting of illumination or transmit-waveform parameters, receiver processing mode parameters, and transmitting antenna control parameters; and providing the selected set of operating parameters to at least one respective selected radar sensing node of a plurality of radar sensing nodes in said surveillance system so that said selected radar sensing node operates in accordance with said selected set of operating parameters, the selecting of said at least one set of radar operating parameters including operating said cognitive radar controller to consult or access a repository containing stored historical target information entailing results of radar scans in accordance with previous selected sets of radar operating parameters, thus enabling a learning from the environment and consequences of past radar operating decisions.

17. The method defined in claim 16, further comprising accessing said repository to obtain some of said receiver information in real-time.

18. The method defined in claim 16 wherein said region of interest is one or more attention cells selected from an arrangement of predefined cells in said surveillance volume, said predefined cells collectively covering said combined surveillance volume.

19. The method defined in claim 16 wherein said region of interest is defined in relation to a target of interest identified as such by predetermined behavioral indicia.

20. The method defined in claim 19 wherein said target of interest is dynamic and said region moves with said target of interest.

21. The method defined in claim 16 wherein said region is defined in relation to an environmental disturbance such as weather.

22. The method defined in claim 16 wherein said region is defined in relation to geometries of interest taken from the set including borders and exclusion zones.

23. The method defined in claim 16, further comprising automatically analyzing behaviors of detected targets and thereby detecting suspicious behaviors in accordance with predetermined indicia.

24. The method defined in claim 16 wherein said attention request is initiated by an event taken from the group consisting of an operator request or an automatic request in response to a detection of suspicious target behavior.

25. The method defined in claim 24 wherein the automatic analyzing of behaviors of detected targets includes generic operating digital processing circuits modified by software computing algorithms taken from the group consisting of fuzzy logic, neural networks and probabilistic reasoning to detect suspicious target behavior.

26. The method defined in claim 16 wherein said improved surveillance performance includes increased target detection sensitivity over said region of interest.

27. The method defined in claim 26, further comprising maintaining overall performance across said combined surveillance volume within acceptable limits while improving performance in said region of interest.

28. The method defined in claim 16 wherein the operating of said cognitive radar controller to consult or access said repository for stored historical target information includes using adaptive target maps based on targets of opportunity observed by said method in said environment.

29. The method defined in claim 16, further comprising operating said cognitive controller to execute a perception-action cycle at a clock rate determined by a master clock of a cognitive radar information network, said radar sensing node being part of said cognitive radar information network, said master clock being operatively connected to a receiver of said radar sensing node and to said repository for aligning in time said receiver information with receiver information from other radar sensing nodes in said cognitive radar information network, operating said cognitive controller to execute a perception-action cycle including transmitting radar information along a feedback path between said receiver and said cognitive controller effected by an operative connection between said cognitive controller and said repository, thereby enabling an execution of said perception-action cycle.

30. The method defined in claim 29 wherein said feedback path is based on the entropic state derived from the multiple tracked targets tracked by said method.

31. The method in claim 16 wherein said at least one radar sensing node is one of a plurality of radar sensing nodes each taken from the group consisting of fixed, surface-mounted marine radars, agile radars, ship-based radars, mobile radars, aerostat radars, air traffic control radars, and military radars.

32. A method for controlling a surveillance radar system including at least one radar node, comprising: storing, in a repository or database, radar decisions previously taken in response to respective sets of target attributes, each of which characterizes the nature of targets of interest requiring attention for a particular region contained within the combined surveillance volume of said radar system, each said radar decision taking the form of selection of radar control parameters including illumination parameter vectors and receiver processing mode parameters; storing in said repository or database said sets of target attributes; storing, in said repository or database, respective consequences of said decisions as to radar control parameters used in monitoring said targets of interest, said consequences comprising effects on surveillance performance figures of merit for said targets of interest by said system in said region; receiving radar data from said at least one radar node and generating target information from said radar data and storing said target information in said repository or database; processing said stored target information to generate adaptive target maps, said adaptive target maps organized as to said radar control parameters; storing said adaptive target maps in said repository or database; accessing said adaptive target maps in said repository or database; based on said adaptive target maps, said decisions, and said consequences in said repository or database, and in response to a current set of target attributes for said region, selecting an illumination parameter vector and a set of receiver processing mode parameters for at least one selected radar node; sending the selected illumination parameter vector and the selected set of receiver processing mode parameters to said at least one selected radar node for modifying the operation thereof.

33. The method defined in claim 32, further comprising filtering the adaptive target maps into subgroups in accordance with said sets of target attributes.

34. The method defined in claim 32 wherein said selected target attributes are taken from the group consisting of speed, direction, acceleration, and radar cross section.

35. The method defined in claim 32 wherein the processing of said stored target information to generate said adaptive target maps includes extracting, from said repository or database, recent targets of opportunity associated with current transmitter and receiver modes to update the adaptive target maps.

36. The method defined in claim 32 wherein the update rate(s) of adaptive target maps is selected in accordance with use requirements.

37. A method for controlling a radar network, comprising: receiving radar data over a network from multiple radar nodes distributed throughout a region; processing the radar data to detect a suspicious target or an environmental disturbance and to characterize said target or environmental disturbance with a set of attributes; defining one or more volumetric attention cells in said region; determining which of said attention cells are associated with said suspicious target or environmental disturbance; accessing a database or repository of past radar control parameter vectors, each previously selected and used in response to past said respective set of attributes, each of said radar control parameter vectors including an illumination parameter vector and receiver processing mode parameter vector for at least one radar node; selecting from said database or repository an illumination parameter vector and a receiver processing mode parameter vector for at least one radar node from among said multiple radar nodes in said region, wherein said attention cells determined to be associated with said suspicious target or environmental disturbance are located within a surveillance volume of said at least one radar node; and sending the selected illumination parameter vector and the selected receiver processing mode parameter vector to said at least one radar node for modifying the operation thereof so as to ultimately improve radar surveillance performance in said attention cells pertaining to said suspicious target or environmental disturbance.

38. The method defined in claim 37 wherein said attention cells are defined after identifying the attributes of said suspicious target or environmental disturbance.

39. The method defined in claim 37 wherein said attention cells are predefined, prior to processing the radar data to identify attributes of said suspicious target or said environmental disturbance.

40. A method for controlling a radar operation including successive perception-action cycles, said method comprising: during each said perception-action cycle: energizing a radar transmitter to transmit an electromagnetic waveform to illuminate an environment; activating an associated receiver to (a) make measurements of the environment from incoming electromagnetic echoes generated by the environment in response to the transmitted waveform and (b) provide feedback information about the environment at least indirectly back to said transmitter, said feedback information based on the multi-target entropic state calculated from the track state-estimation error information associated with the targets of opportunity tracked in the surveillance volume of said radar; and (c) adaptively selecting in accordance with prior radar scan results, a new and potentially different illumination to energize said transmitter during a succeeding perception-action cycle.

41. The method defined in claim 40, further comprising automatically storing, in a repository or database, radar scan results including said measurements and data characterizing the transmitted electromagnetic waveform, the adaptive selecting of said new and potentially different illumination including operating a cognitive controller operatively connected to said repository or database.

42. The method defined in claim 40 wherein the activating of said associated receiver includes operating said associated receiver in accordance with a set of receiver processing mode parameters, further comprising adaptively selecting, in accordance with said prior radar scan results, a new and potentially different set of receiver processing mode parameters with which to activate said receiver during said succeeding perception-action cycle.

43. A method for controlling a radar surveillance network consisting of multiple radar nodes, comprising: dividing up a combined surveillance volume of said network into a number of predefined attention cells or regions for applying attention; detecting a situation of interest such as a suspicious target, environmental disturbance or area of interest, said situation of interest being associated with at least one of said attention cells; determining a subset of radar nodes whose respective surveillance volumes intersect with said at least one of said attention cells; deciding to focus said network's attention on said at least one of said attention cells; focusing attention on said at least one of said attention cells by selecting a new radar parameter vector for use by at least one of said subset of radar nodes; using said selected new radar parameter vector to reconfigure a transmitter and a receiver of said at least one of said subset of radar nodes so as to improve performance in said at least one of said attention cells; said selecting of said new radar parameter vector determined adaptively by learning from past selections made in response to similar, previous situations of interest and their respective impact on surveillance performance in the vicinity of said at least one of said attention cells.

\* \* \* \* \*